United States Patent [19]

Wray

[11] 4,032,224

[45] June 28, 1977

[54] SOUND RECORDING AND REPRODUCING SYSTEM FOR SOUND MOTION PICTURE PHOTOGRAPHY

[75] Inventor: William R. Wray, West Roxbury, Mass.

[73] Assignee: Polaroid Corporation, Cambridge, Mass.

[22] Filed: Nov. 7, 1974

[21] Appl. No.: 521,839

[52] U.S. Cl. .................................. 352/11; 352/26; 352/27; 360/3; 360/67

[51] Int. Cl.² ........................................ G03B 31/02

[58] Field of Search ............. 352/5, 25, 38, 26, 27, 352/11; 360/3, 27, 67, 65

[56] References Cited

UNITED STATES PATENTS

| 2,480,162 | 8/1949 | Rath | 352/5 |
|---|---|---|---|
| 3,508,817 | 4/1970 | Hnilicka, Jr. | 352/5 |
| 3,832,045 | 8/1974 | Wilson et al. | 352/25 |
| 3,932,032 | 1/1976 | Weinstein | 352/27 |

Primary Examiner—Russell E. Adams

Attorney, Agent, or Firm—John W. Ericson; Edward S. Roman

[57] ABSTRACT

A sound recording and reproducing system comprising a motion picture camera in which there is a synchronization system for recording segments of sound from a signal produced by a microphone associated with the camera as analog samples alternatively read into each of two analog shift registers in increments of samples corresponding to one frame time of the taking picture cycle. Means are provided for recording each such approximately timed sample sequence onto the film adjacent the frame being photographed during pulldown of the film in the camera. For playback, a projector is provided which comprises two analog shift registers each alternatively used for taking the samples recorded on the film for each frame for storage during pulldown, and then to transmit the stored samples through a filter to a loud-speaker for reproduction at a continuous rate during projection of the photographic images recorded on the film.

6 Claims, 18 Drawing Figures

SOUND RECORDING AND REPRODUCING SYSTEM FOR SOUND MOTION PICTURE PHOTOGRAPHY

This invention relates to sound motion picture photography, and particularly to a novel sound recording and reproducing system therefor.

Extensive efforts have been made in recent years to devise systems particularly for use by the amateur, for producing sound motion pictures of the type in which the sound is recorded on the film at the same time that the picture is taken. Most of the many excellent systems which have been devised for producing high quality sound motion pictures have not found acceptance by amateurs, because the procedures required for the production of the sound film require talents beyond the desire or ability of the amateur to acquire or equipment involving a capital expenditure beyond the realm of reason for the pursuit of a hobby, or both.

The simpler sound cinematography systems proposed have so far failed to attract the interest of a wide number of persons, because their performance is not satisfactory. A current difficulty in this regard is that the amateur is usually able to make an unfavorable comparison between his sound movies, produced by whatever methods, and the professonal motion pictures produced on his television set.

One problem in this regard is that the requirements for motion picture photography and for sound recording are essentially in conflict. Sound recorded on film is most easily reproduced if the sound track is advanced at the same constant speed during recording and reproduction. On the other hand, conventional methods of motion picture photography require the film to be advanced intermittently in the camera for exposure.

To meet these conflicting requirements, it has formerly been found necessary, as a practical matter, to record a frame of photographic information at one location on the film, and to record the accompanying sound at a different location. The approach usually adopted has been to separate the sound station from the film gate by an appreciable distance. A loop is formed between the film gate and the sound station, and the film is caused to move more or less uniformly past the sound station even though it is moving intermittently past the film gate.

The requirements for uniformity of speed past the sound station in such a system have been relaxed by numerous proposals, all designed to reduce the effects of wow and flutter introduced into a sound recording when the film motion is not absolutely uniform. For example, U.S. Pat. No. 3,832,045, granted on Aug. 27, 1974 to Stewart W. Wilson and Edwin K. Shenk for WIDE BAND FREQUENCY COMPENSATION SYSTEM IN A SOUND MOTION PICTURE PROJECTOR, assigned to the assignee of this application, discloses a system in which only a moderate amount of motion damping is required between the sound station and the exposure or projection station. This is made possible by the use of a flutter compensator which uses a pilot tone recorded on the film with the audio signal to correct the frequency of the reproduced signal in the projector so that differences in the speed between recording and projection are compensated for and the requirement for the precise constant speed past the recording head is relaxed.

However, as pointed out in the cited patent, the higher the quality required of the resulting sound signal, the more control must be exercised over the system to preserve the necessary bandwidth and avoid too much loss of information in the output. And, while the system proposed in the cited patent does relax the requirements on the camera and projector, in that two separate speed control systems for the film need not be provided, it shares with other practical approaches to the sound motion picture production problem, the difficulty that the sound is recorded at a location remote from the image frame with which it is associated. That means that editing cannot be accomplished without transferring the recorded sound signal to some other medium, such as a recording tape, and then re-recording it on the edited film in some fashion.

Among the objects of this invention are to simplify the production of sound moton picture films of the kind in which the sound track is recorded simultaneously with the picture, to allow the recorded sound to be produced without objectionable wow and flutter. Another significant object is to enable the sound sequence associated with each picture frame to be recorded on the film alongside that frame so that editing can be accomplishd wihout re-recording.

Briefly, the above and other objects of the invention are obtained by a novel camera and projection system characterized broadly by the fact that the sound is recorded on the film adjacent the frame which has just been exposed during pulldown of the film in the camera to go to the next frame for exposure. During projection, the sound is reproduced during the time that the associated frame is perceptably projected to the viewer.

To accomplish these results, the camera is provided with a pair of analog shift registers, which may be of the type described in the above-cited patent, or which may be any of the various so-called bucket brigade type analog shift registers commonly available today, such as the Matsushita Model MN3001, developed and marketed as described on pages 52 and 53 of the Aug. 22, 1974 issue of Electronics magazine.

The basic requirement on the shift registers is that they contain adequate capacity for storing enough samples of an audio signal to reproduce the signal accurately over a period equal to one frame time; e.g., at 20 frames per second, the requirement would be for the storage of signals representing 50 milliseconds of audio. The exact amount of storage required depends upon the amount of bandwidth that the apparatus is designed to conserve at the output. For example, 512 is adequate for approximately 4,000 Hz in bandwidth, whereas a register capable of storing 1024 analog samples would be adequate for approximately 8 to 10 KHz in ultimate bandwidth. The output bandwidth obtainable depends upon the precision with which the speeds of recording and transcription are preserved. In other words, a tradeoff can be made between speed control accuracy, bandwidth preservation and analog shift register capacity.

More particularly, in the camera, a pair of analog shift registers are provided, together with four counters which are employed to keep track of the entry and exit of data from the shift registers. Each of these shift registers is alternatively connected to the input amplifier to store an audio sequence, and then employed, during pulldown, to read out the stored sequence onto a recording track on the film to record it for later transcription. Switching of the registers to interchange their functions is controlled by the position of the camera shutter.

In the projector, a similar complement of analog shift registers and counters is provided. One or the other of the analog shift registers is always connected to the output amplifier, to provide a stream of analog data corresponding to a frame transit time. The shift register not currently connected to the output amplifier waits until appropriate signals are porduced, in response to the position of the projection shutter, to indicate that the previously recorded analog data sequence is ready for reception on the film. The waiting shift register, timed in accordance with the data accumulated in the counters referred to, accepts the data sequence and then waits until the last bit of information in the currently reproducing shift register has been transmitted. Thereupon, the shift registers change functions, and the line of information just entered into one of the shift registers from the film begins to be transcribed into the loudspeaker while the shift register previously transcribing awaits the reception of the next line of data. The manner in which the apparatus of the invention is constructed, and its mode of operation, will best be understood from the following detailed description, together with the accompanying drawings, of an illustrative embodiment of the invention.

In the drawings,

FIG. 18 is a schematic block and wiring diagram illustrating a modification of the apparatus of FIG. 5 desirable for use with the apparatus of FIG. 16 in the alternate embodiment referred to.

Figure 1:
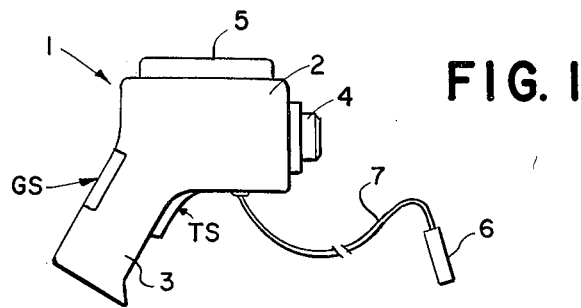
FIG. 1 is a schematic elevational sketch of a camera adapted for use in the system of the invention.

Referring first to FIG. 1, there is shown a camera generally designated 1. The camera 1 may be of any conventional construction adapted to produce motion pictures, such as a conventional Super 8 motion picture camera, except as such a camera is required to be modified in respects to be described below.

In particular, the camera 1 has a housing 2 adapted to contain a supply of film, and drive and control apparatus to be described. Also included in the housing 2, or in a hand grip 3 formed as a part of the housing are the circuits, to be described in more detail below, for recording sound as pictures are being taken.

The camera is provided with a taking lens in a barrel 4, adapted in any conventional way for focusing if desired, and with a viewfinder 5 of any conventional construction. Preferably, the camera is provided with a grip switch GS, which is closed for purposes to be described when the camera is held in the hand by the grip 3. A trigger switch TS is provided which, when depressed, operates in a manner to be described to cause the apparatus to record a sound motion picture. A recording microphone 6, of any conventional construction, is electrically connected to the recording circuits in the camera over a conventional cable designated 7.

Figure 2:
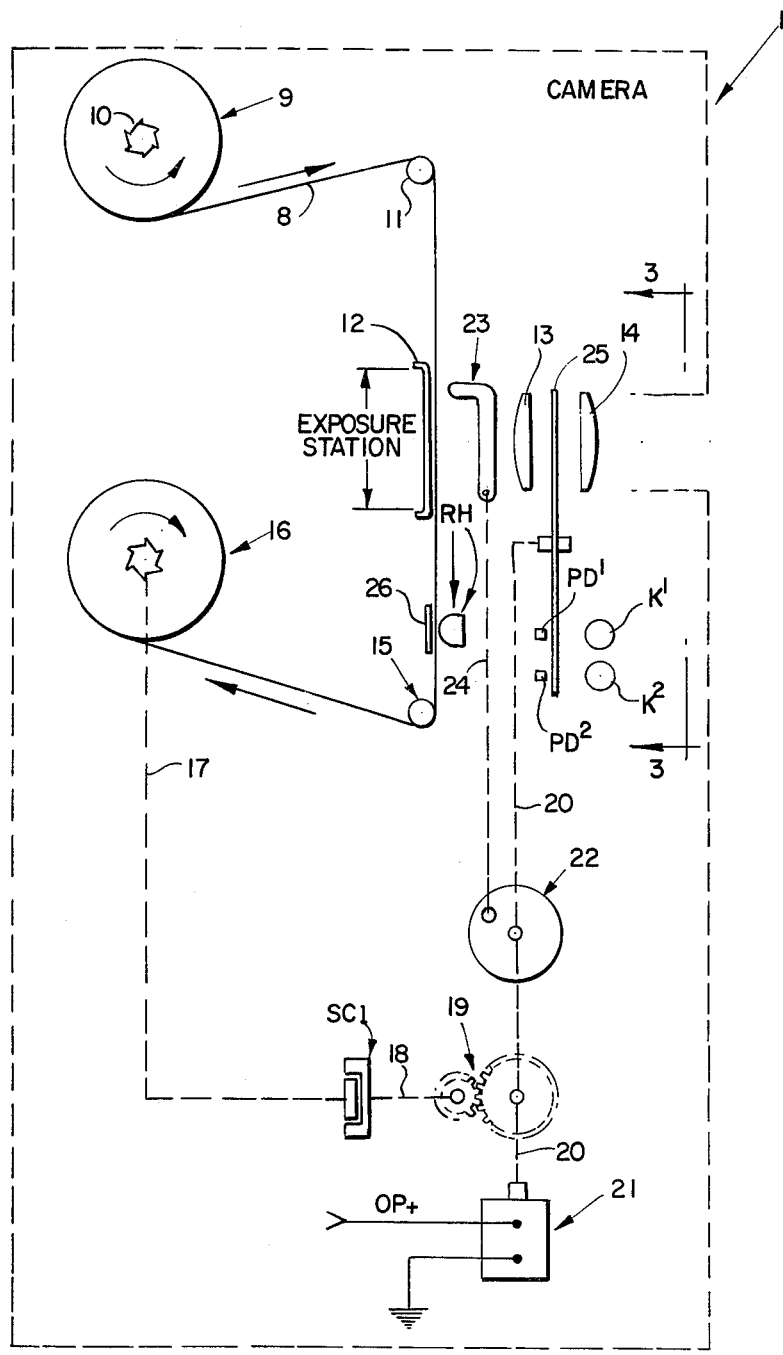
FIG. 2 is a schematic diagram of selected elements of the camera of FIG. 1, showing pertinent relationships between the parts.

FIG. 2 shows certain internal aspects of the camera 1. As indicated, a supply of film 8 is initially disposed primarily on a supply reel 9 disposed on a sprocket 10 which is journalled in the housing of the camera 1, in any suitable conventional manner, for rotation in a sense illustrated by the arrow. From the supply reel 9, the film passes over an idler 11, rotatably mounted in the housing of the camera 1 in any suitable conventional manner. The idler 11 serves primarily to keep the film 8 in a straight path past an exposure station defined by a pressure plate 12 of any conventional construction which holds the film flat in a film gate, not shown, for exposure through a lens comprising elements 13 and 14.

From the exposure station, the film passes a pair of recording heads collectively designated RH located at the leading edge of the frame ahead of the frame being exposed. The film 8 passes from the exposure station over a conventional snubber roll 15, and thence to a takeup reel generally designated 16.

The takeup reel 16 is arranged to be driven in the direction of the arrow by means of a sprocket connected to a shaft schematically indicated at 17. The shaft 17 is at times driven through a conventional slip clutch SC1 having an input shaft 18. The shaft 18 is driven, through speed increasing gears suggested at 19, by the output shaft 20 of a conventional DC motor 21.

The motor 21 may be assumed to include suitable reduction gearing, so that its armature rotates at a considerably higher speed than the speed of the output shaft 20. Precise regulation of the speed of the motor 21 is not required in accordance with the invention, and a simple inertial governor will serve to keep the speed within the necessary bounds. In particular, the speed of the motor 21 should be kept within outer bounds of, say, ten percent, a relativey easy matter, or more preferably within a readily attainable range of ± five percent, which is still not difficult to attain and yet will permit a considerable increase in the attainable bandwidth in the audio output produced by the system in a manner to be described.

Motor 21 is arranged to be energized, driving the shaft 20 and its connected shafts and gearing, when a supply voltage labeled OP+ is present with respect to ground. This potential OP+ is produced when the trigger switch TS described above is closed, as will appear.

The shaft 20 of the motor 21 also drives a cam, rather schematically indicated at 22, which is coupled to a film drive pawl 23 as suggested at 24. This film drive pawl mechanism may be of any conventional variety well known to those skilled in the art, and serves to engage a sprocket hole formed in the film 8 and pull it down intermittently to present successive frames of the film for exposure.

The shaft 20 of the motor also drives a conventional shutter 25, so that the exposure aperture is successively opened for exposure of a frame, and then closed by the shutter 25 while the film is pulled down for the next frame by the film drive pawl 23.

As suggested in FIG. 2, and to be described in more detail below, a pair of light sources illustrated as two lamps K1 and K2 are arranged on one side of the shutter 25, and a pair of photodiodes PD1 and PD2 are arranged on the other side of the shutter 25. Over a certain range of shaft angles of the shutter 25, to be described, the lamp K1 illuminates the photodiode PD1, and over another range of shutter angles the lamp K2 illuminates the photodiode PD2, for purposes to be described.

The photodiodes PD1 and PD2 may be light-responsive diodes of the known variety, or simply photocells of suitable response times. The lamps K1 and K2 may be small light bulbs, such as the familiar "grain of wheat" bulb, or they may be light-emitting diodes or the like.

Figure 3:
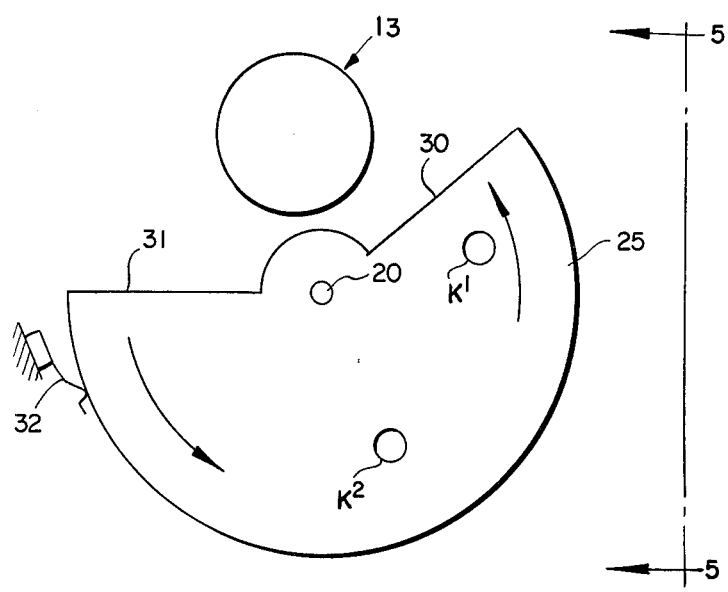
FIG. 3 is a schematic elevational view of a shutter, lens and associated photodetecting apparatus forming a portion of the apparatus of FIG. 2, taken essentially along the lines 3—3 in FIG. 2, with parts omitted and on an enlarged scale.

Referring next to FIG. 3, the shutter 25 is shown in more detail in its operative relationship to the lens element 13. The shutter 25 serves in a conventional manner to sequentially expose and cover the effect aperture of the lens 13.

The shutter 25 is driven by the shaft 20 in the direction of the arrow, at a speed such as 20 revolutions per second, corresponding to a frame rate of 20 frames per second, or any other suitable frame rate in the practical range of eighteen to 24 frames per second. As indicated, the shutter 25 is essentially a disc provided with an aperture having a trailing edge 30 spaced from a leading edge 31 by approximately 120°, to give an exposure of 1/60 second per frame at 20 frames per second.

Any conventional means may be provided for stopping the shutter 25 in a position closing the aperture of the lens 13 at the end of a sequence of exposure cycles. As suggested in FIG. 3, this may take the form of a resiliently biased detent 32 fixed to the frame of the camera and adapted to engage the trailing edge 30 of the blade in a position just before the position in which the leading edge 31 of the exposure aperture will pass over the lamp K1, allowing it to illuminate the photodiode PD1 in FIG. 2. The lamp K1 and the photodiode PD1 should be so located that the shutter will thus expose the photodiode to the lamp towards the end of, or just after, pulldown, and before an exposure is begun. In this position of the parts, the lamp K2 will illuminate the photodiode PD2. The lamp K2 passes into the exposure aperture between the edges 30 and 31 when the leading edge 31 passes over it just after pulldown has begun. The purpose of these physical dispositions of the parts will be explained below.

Figure 4:
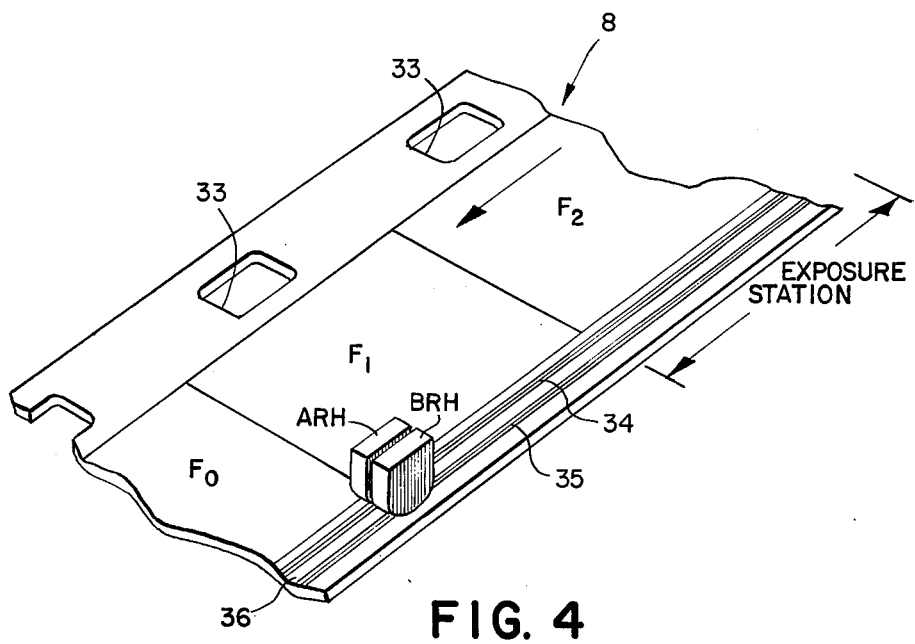
FIG. 4 is a schematic perspective sketch of a portion of motion picture film adapted for use in the apparatus of the invention, showing its association with an exposure station and with recording heads in the camera of FIG. 1.

FIG. 4 shows a portion of the film 8 in its relation to the exposure station in the camera of FIGS. 1 and 2. The film 8 can be coated with any suitable photographic emulsion of any conventional variety processable to form a black and white or color transparency viewable by transmitted light. Most conveniently, for use for amateur purposes, the film may be of the conventional Super 8 millimeter or 8 millimeter format.

As indicated in FIG. 4, the film 8 is provided along its edges with sprocket holes 33 to allow the film to be advanced by the drive pawl 23 of FIG. 2, a frame at a time, to successively expose frames such as the frames F0, F1 and F2 illustrated, as the film is incrementally advanced in the direction of the arrow to successive exposure positions in the exposure station. At the leading edge of the film frame F1 ahead of the frame F2 in the exposure station, in the direction of motion illustrated by the arrow, are disposed the record heads RH of FIG. 2, shown as a pair of recording heads ARH and BRH in FIG. 4.

The recording heads ARH and BRH may be any conventional sound recording transducers. They are preferably made in an integral unit, so that the relationship between the recording gap in the head ARH relative to the recording gap in the head BRH can be repeatably maintained from camera to camera. The phase relationship between the signals recorded by the heads ARH and BRH is significant, as will appear.

The heads ARH and BRH are arranged to record information on a pair of tracks 34 and 35. These tracks may be simply spaced locations on a stripe 36 of conventional magnetic recording material coated on the right-hand edge of the film 8 as seen in FIG. 4. As will appear, during the exposure of a frame as the frame F2 in FIG. 4 at the exposure station, sound which is produced to accompany the frame is recorded. After the exposure, and during the pulldown of the film from the position shown in FIG. 4, to the position in which the frame F2 takes the position of the frame F1 in FIG. 4, the head ARH records an audio signal representing the sound previously stored during exposure of the frame F1, and the head BRH produces a clock signal to accompany the audio signal recorded by the head ARH to enable it to be reproduced in frequency and amplitude in a manner to be described below.

Figure 5:
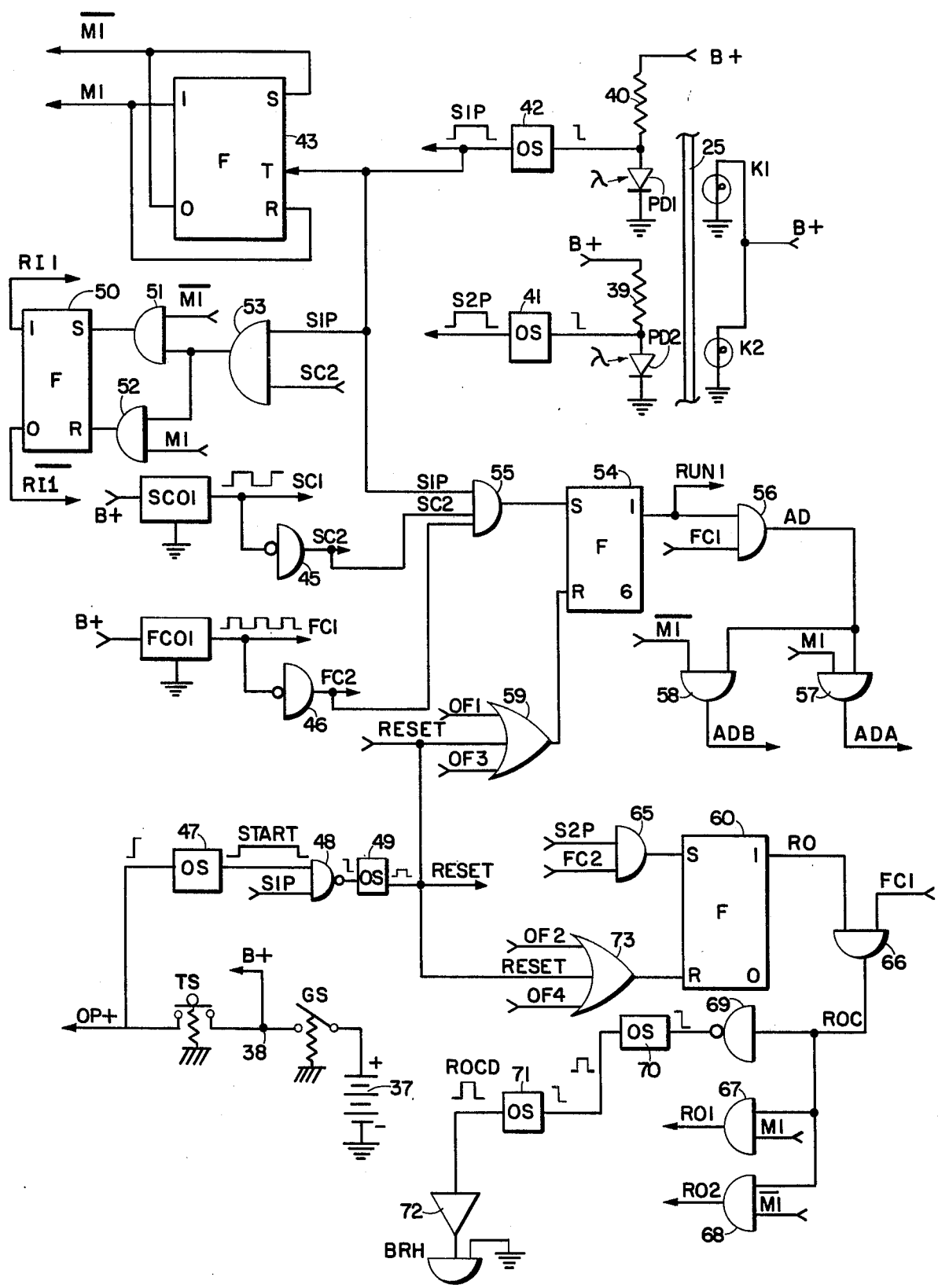
FIG. 5 is a schematic block and wiring diagram of electronic timing circuits forming a portion of the control system for the camera of FIG. 1, showing portions of the shutter and photodetecting apparatus of FIGS. 1 and 3 essentially along the lines 5—5 in FIG. 3.

It may occur to those skilled in the art that the signals supplied to the heads ARH and BRH during recording could be combined and supplied to a single head, and the recorded signals separated by filtering. While this might be done without departing from the scope of the invention in its broader aspects, it is not preferred. As will appear, the film movement during pulldown occurs over a considerable speed range during acceleration and deceleration of the film, and the corresponding changes in the frequencies of the recorded signals during reproduction would make the filtering problem quite difficult if any reasonable audio bandwidth was to be conserved. Another reason for preferring the arrangement shown is that the signal recorded by the head BRH is preferably a digital signal indicating by each occurrence the location of a sample at intervals that were equal during recording. Accordingly, as little noise as possible on the track 35 is desirable, and therefore it is preferred to keep the clock signal as the only signal to be recorded on this track. on the operation of FIG. 5 shows portions of a recording control system for the camera of FIG. 1, including elements of the apparatus described above in connection with FIGS. 1 through 4, and timing circuits controlled thereby. A fundamental condition on the apparatus is the closure of the grip switch GS. As shown in FIG. 5, there is provided in the camera a suitable source of power, here shown as a battery 37, having a negative terminal connected to a terminal identified as ground, and a positive terminal connected over the grip switch GS to a terminal 38 which is at the potential of the positive terminal of the battery 37 when the grip switch GS, indicated as a single pole, single throw, spring returned switch, is closed by the operator gripping the hand grip 3 of the camera of FIG. 1.

When this potential appears, the power supply connections required for the various circuits to be described, which are not shown or described in detail as they may be of conventional construction as will be apparent to those skilled in the art, are completed so that any transients occurring as the circuits are brought to appropriate operating stages are past before photography is begun by closure of the trigger switch TS.

The switch TS is shown as a conventional spring returned push button. If desired, in order to make sure that operation of the system begins with the closure of the switch GS and is followed by the closure of the switch TS, the switches may be interlocked mechanically in any conventional manner so that the switch TS cannot make its contacts before the switch GS is closed.

One of the transients referred to above will next be considered with respect to the operation of the shutter detecting photodiodes PD1 and PD2. As shown in FIG. 5, the lamps K1 and K2, described above in connection with FIGS. 2 and 3, are energized when the potential B+ is present by a circuit connected from that terminal through their filaments to ground. In the position of the shutter 25 retained by the detent 32 at the end of each operating cycle, the lamp K2 will illuminate the photodiode PD2 as soon as the signal B+ is applied.

As shown, the photodiode PD2 is a conventional photoresponsive diode. If desired, it may be a photocell, such as a cadmium sulfide cell, or the like. The photodiode PD2 is connected between ground and the supply terminal at B+ through a current limiting resistor 39. A similar connection is made from the terminal at B+ through a current limiting resistor 40 and the photodiode PD1, which could also be a photocell in an alternate embodiment if so desired.

The junction between the resistor 39 and the photodiode PD2 is connected to the active input terminal of a conventional one-shot multivibrator 41. When the lamp K2 initially illuminates the photodiode PD2 as the signal B+ appears, a falling transition is produced at the input terminal of the multivibrator 41, triggering the multivibrator to produce a pulse labeled S2P. This pulse has no effect, since it will precede the closure of the trigger switch TS.

The photodiode PD1 will not initially be illuminated by the lamp K1, because the shutter 25 will block the optical path between the lamp K1 and the photodiode PD1 at the initial starting position of the parts. However, when the photodiode PD1 is first illuminated by the lamp K1 during the initial movement of the shutter just prior to an exposure, the falling transition produced at the junction of the photodiode PD1 and the resistor 40 will trigger a conventional one-shot multivibrator 42 to produce a positive pulse labeled S1P.

The leading edge of this pulse S1P will trigger a conventional synchronous flip flop 43. The flip flop 43 is shown as the conventional variety having a set input terminal S, a reset input terminal R, an output terminal labeled 1 that is positive, or logic 1, when the flip flop is set, and a logic 0 output terminal, labeled 0, which is at ground or logic 0 potential when the flip flop is set.

The set terminal of the flip flop 43 is connected to its logic 0 output terminal, and the reset input terminal R is connected to the logic 1 output terminal. It will be recognized that in this form the flip flop is connected as a one-stage binary counter, which changes state each time a trigger transition is applied to its trigger input terminal T. The set state of the flip flop 43 is labeled M1, present at logic 1 when the flip flop is set, and the reset state is labeled $\overline{M1}$, present at logic 1 when the flip flop is reset.

When the supply potential at B+ appears, a first clock oscillator SCO1 produces a train of fixed clock pulses labeled SC1 at a repetition rate of, for example, 18.6 KHz. This train of pulses is applied to the input terminal of a NOR gate 45 to produce a complementary train of clock pulses SC2 180° out of phase with the clock pulses SC1. As will appear, the pulses SC1 are used to clock samples of an audio signal produced by the recording microphone 6 into an analog shift register, and the clock pulses SC2 are used to move the stored samples to a second location in each stage of the register, whence they are transferred to the next stage of the register during the succeeding clock pulse SC1.

A similar clock oscillator FCO1 produces pulses at a frequency of, for example, three times the frequency of the pulses SC1, or 55.8 KHz in the example give. These pulses, labeled FC1, are applied to a NOR gate 46 to produce a complementary train of clock pulses FC2 180° out of phase with the pulses FC1.

There is no essential relationship between the phase of the pulses SC1 and FC1 in the recording system in the camera in accordance with the invention. The repetition rate of the pulses SC1 is related to the duration of the pulses S1P and S2P in that the one-shot multivibrators 42 and 41 are each designed to produce output pulses having a duration enough longer than half a period of the pulses SC1 and SC2 so that at some time during each pulse S1P there will be at least one occurrence of a positive pulse SC2, and similarly during the duration of each pulse S2P there will be an occurrence of at least one portion of a pulse SC2.

When the switch TS is first closed to start operation of the camera to take pictures, a signal labeled OP+ which is essentially the positive potential of the battery 37 with respect to ground, appears. The rising transition thus produced when the switch TS is closed triggers a conventional one-shot multivibrator 47 to produce a pulse labeled START that has a duration sufficient to be sure that the shutter 25 is moved far enough to expose the lamp K1 so that the pulse S1P is produced, before the start pulse disappears.

The pulses S1P and START are applied to a conventional NAND gate 48, so that when both of these pulses first appear together at logic 1 a falling transition is produced at the output of the gate 48. This transition triggers a conventional one-shot multivibrator 49 to produce a short pulse labeled RESET, effective to start the apparatus in an appropriate operating state in a manner to be described below.

The basic operating cycle of the camera of FIGS. 1 through 5 is divided into two operational modes selected by the state of the flip flop 43. As noted, this flip flop changes state each time the shutter pulse S1P is produced, and thus changes state once each exposure cycle frame in the film being produced.

At all times during the operation of the camera in photography, the signal produced by the microphone 6 in FIG. 1 is being stored in either one or the other of two analog shift registers to be described. The selection of these registers is determined by the state of a flip flop 50 of any conventional construction.

The flip flop 50 is arranged to be set, to produce a signal labeled RI1 at logic 1 potential, directing the entry of information from the microphone into a first register, when an AND gate 51 produces a logic 1 signal at its output terminal. The flip flop 50 is reset, producing a signal labeled $\overline{RI1}$ at logic 1 potential, at its logic 0 output terminal, when an AND gate 52 produces a logic 1 signal at its active output terminal.

Each of the gates 51 and 52 have two input terminals. The gate 51 has one input terminal connected to receive the signal $\overline{M1}$ from the logic 0 output terminal of the flip flop 43. Similarly, the gate 52 has one input terminal connected to receive the complementary signal M1 from the logic 1 output terminal of the flip flop 43.

A second input terminal of each of the gates 51 and 52 is connected to the output terminal of a conventional AND gate 53 that produces a logic 1 output signal to change the state of the flip flop 50 each time a pulse S1P is produced and a slow clock pulse SC2 occurs. The reason for gating the transition of the flip flop 50 with the signal SC2 is to ensure that the analog shift registers, to be described, are not in the sample mode when they are interchanged.

As noted above, the shutter pulse S1P changes the register into which samples of the audio signal from the microphone 6 are taken at each pulse SC1, or once each shutter cycle. Since the frequency of the sampling pulses SC1 is fixed, whereas the speed of the motor may vary over a range, the number of samples stored will thus vary over a range depending on the allowed range of excursions of the speed of the motor 21. The analog storage registers are designed to accept the maximum number of samples that will be stored during an exposure cycle, corresponding to the minimum speed of the motor 21.

The number of samples thus entered into a register during an exposure cycle will vary between the maximum number that can be stored and a minimum number corresponding to the greatest speed allowed for the motor 21. In accordance with the invention, after a register is loaded and its transfer to the readout mode is directed by the pulse S1P, it is desired to advance the samples in the register, without entering new information, until the samples appear at the end of the register, from which they are to be read onto the tracks 34 in FIG. 4 together with locating clock samples on the track 35 recorded by the head BRH.

For this purpose, following each recording cycle for a register, there is a runout cycle during which the contents of the storage register are advanced to the end. This operation is carried out under the direction of a flip flop 54.

The flip flop 54 has its set input terminal connected to the output terminal of a three input terminal AND gate 55. The gate 55 produces a logic 1 output signal at its output terminal, setting the flip flop 54, when the pulses S1P, SC2 and FC2 are all present at logic 1. The pulse SC2 insures that the last transfer of data to the analog shift register has been completed before it is put in the runout mode. The clock pulse FC2 insures that the flip flop 54 will be set, to produce a signal labeled RUN 1 at its logic 1 output terminal, before the next pulse FC1 comes along. As indicated, when the next pulse FC1 does come along with the label RUN 1 present, an AND gate 56 is enabled to produce a signal labeled AD, which is used to advance the shift register currently out of the recording mode, as well as certain tracking counters to be described, until the contents of the shift register are advanced to the end.

As shown, the signal AD is supplied to one input terminal of each of two AND gates 57 and 58, one of which gates is always enabled. In particular, the gate 57 has a second input terminal receiving the level M1 from the flip flop 43, and the gate 58 has a second input terminal receiving the complementary level $\overline{M1}$. Depending on the state of the flip flop 43, the pulse AD thus causes an advance pulse labeled ADA or ADB to be produced, which pulses are used to advance particular registers in a manner to be described.

The flip flop 54 is reset to end the runout cycle by an OR gate 59 having its output terminal connected to the reset terminal of the flip flop 54. The gate 59 has two input terminals receiving overflow pulses OF1 and OF3, each produced by a different one of the tracking counters to be described in a manner to appear. The gate 59 also receives the RESET pulse initially produced at the start of an operating cycle to be sure that the flip flop 54 begins in its reset state.

Each shutter pulse S2P, produced by the one-shot multivibrator 41 in FIG. 5, marks the beginning of an interval during which the film is moving during pulldown at an appropriate speed for recording. Recording on the film is directed by a flip flop 60.

The flip flop 60 is arranged to be set by an AND gate 65 when the pulse S2P is present and a fast clock pulse FC2 is present at logic 1. The flip flop 60 thus assumes its set state, producing a signal labeled RO at logic 1, at a time FC2 before the next fast clock pulse FC1 appears.

When the pulse FC1 appears, the level RO and the pulse FC1 enable an AND gate 66 to produce a readout clock pulse labeled ROC at logic 1. The pulse ROC is used to direct the readout of one of two storage registers to the record head ARH in a manner to be described, under the direction of the flip flop 43.

For this purpose, the pulse ROC is applied to one input terminal of each of two AND gates 67 and 68. The gate 67 is enabled when the level M1 is present, and the gate 68 is enabled when the level $\overline{M1}$ is present. Accordingly, at each pulse ROC, a readout pulse RO1 is produced by the gate 67 when the signal M1 is present, and a readout clock pulse RO2 is produced by the gate 68 when the level $\overline{M1}$ is present.

The readout clock pulses ROC are also applied to the input terminal of a NAND gate 69, used as an inverter. The falling transition produced at the output terminal of the gate 69 when the clock pulse ROC is present is used to trigger a conventional one-shot multivibrator 70 to produce a positive output pulse. At the trailing edge of the output pulse produced by the one-shot multivibrator 70, a second one-shot multivibrator 71 is triggered to produce a delayed pulse labeled ROCD, which is applied to a suitable conventional recording amplifier 72 having its output terminals connected to the recording head BRH. The purpose of delaying the readout clock pulse in this fashion is to match the delay inherent in the low pass filter required for audio recording, as will be described.

The flip flop 60 is arranged to be reset by an OR gate 73 in response to any of the signals OF2, OF4 or RESET. The RESET signal is applied to this gate to make sure that the apparatus starts out with the flip flop 60 reset. The pulses OF2 and OF4 are overflow signals from tracking registers, to be described, which are produced when all of the useful information in an analog register has been transferred to the tape during the readout operation.

Figure 6:
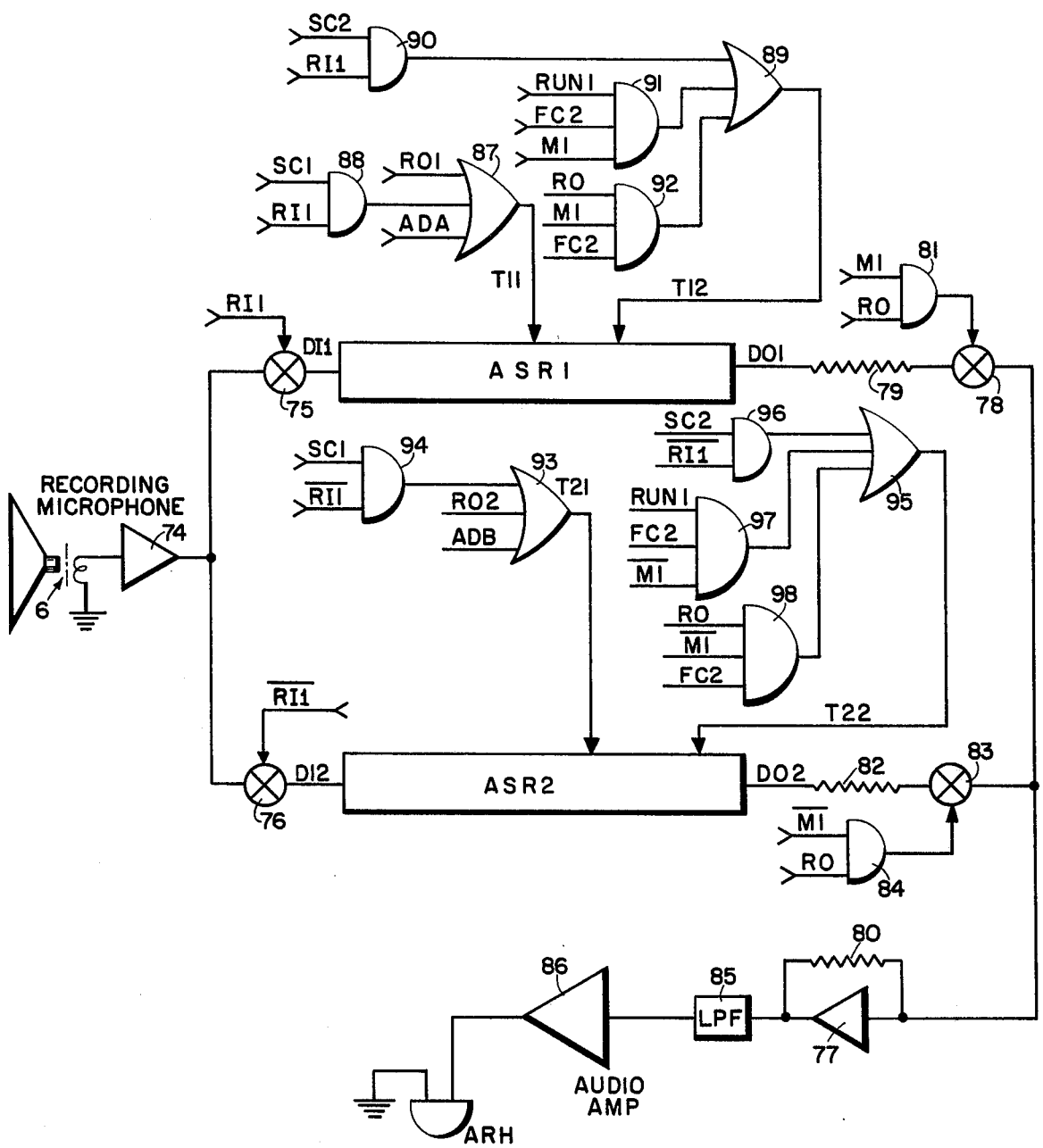
FIG. 6 is a schematic block and wiring diagram of control circuits forming a part of the camera of FIG. 1 and adapted to store sound received by a microphone and to apply it to a recording head at a different time.

Referring next to FIG. 6, there are shown the analog storage and recording circuits for the camera described above in connection with FIGS. 1 through 5. As indicated in FIG. 6, the recording microphone 6 is connected (over the cable 7 in FIG. 1) to the input terminals of a conventional preamplifier 74.

The active output terminal of the amplifier 74 is connected over the load terminals of a conventional electronic switch 75 to the input terminal of a conventional analog shift register ASR1. The switch 75 is of any conventional variety, having a closed state produced when a logic 1 input signal is applied to its control terminal. This signal, labeled RI1, is present at logic 1 when the flip flop 50 in FIG. 5 is set in the manner described above.

When the flip flop 50 is reset, a signal $\overline{RI1}$ is applied to the control terminal of a second electronic switch 76 in FIG. 6. When the switch 76 is closed by the signal $\overline{RI1}$, it connects the active output terminal of the amplifier 74 to the input terminal of a second analog shift register ASR2.

The analog shift registers ASR1 and ASR2, and other such analog shift registers to be described below in connection with the projector, may be of the type described in the above-cited patent and to be briefly described below in connection with FIG. 14. Alternatively, they may be the so-called bucket brigade type integrated circuit, such as the Amperex N449N3, or the Matsushita MN3001 referred to above.

Shift registers of the integrated circuit bucket brigade type may require minor variations in circuit operating potentials and logical states, as will appear from their manufacturer's specifications. However, for the illustrated system, in which the apparatus to be described in connection with FIG. 14 is employed, each of the shift registers such as ASR1 and ASR2 may be assumed to comprise a suitable number, for example, 1024, of analog stages each comprising a first section and a second section.

The first section of each stage of each shift register receives a sample when a first phase signal T11, for the register ASR1, or T21, for the register ASR2, is produced at logic 1. During these sampling times, the first stage of the register ASR1 will receive an analog data signal DI1 if the switch 75 is closed, and otherwise it will receive an open circuit signal. Similarly, at the time when the pulse T21 is produced, the first stage of the register ASR2 will take in a sample of analog data DI2 if the switch 76 is closed, and otherwise will see an open circuit.

Each stage of the registers such as ASR1 beyond the first will take a sample from the second half of the next preceding stage during the period T11. During the period in which a second sampling signal T12 is produced, a second half of each stage of the register such as ASR1 will receive the contents of the first section. In circuits of the Amperex and Matsushita type described above, it may be necessary that one of the signals T11 and T12, for the register ASR1, for example, is present at all times. In such circuits, the signal such as T12 may be formed as the complement of the signal T11. In a circuit of the type shown in FIG. 14, as will appear, in the absence of either the signal T11 or T12, the register such as ASR1 will remain in the state previously set, for a longer time than it would if the signal T12 was continuously present.

Analog signal samples labeled DO1 appear at the output terminal of the register ASR1. Similarly, analog signals labeled DO2 appear at the output stage of the register ASR2. These signals represent the information stored in the second half of the end stage of the registers, or the stage that would be to the right in FIG. 6. This stage may be considered the last stage from the input side or the first stage from the output side, but it will be considered stage 1 for purposes of this description, as that is the stage which first produces a signal when the apparatus is in the readout mode.

The signals DO1 are at times applied to the active input terminal of an operational amplifier 77 when an electronic switch 78 is closed. The circuit then extends from the output terminal labeled DO1 through a summing resistor 79, the load terminals of the switch 78 in its closed state, and thence to the active input terminal of the amplifier 77. The amplifier 77 is indicated as having a feedback resistor 80 for conventional purposes.

The switch 78 is closed when a logic 1 signal is applied to its control terminal by an AND gate 81, enabled to produce a logic 1 output signal when the signals M1 and RO, produced as described above, are present at logic 1.

Similarly, the signals DO2 produced at the output terminal of the shift register ASR2 are at times applied through a summing resistor 82 and over the load terminals of a conventional electronic switch 83, in the closed state of the switch, to the input terminal of the amplifier 77. The switch 83 is arranged to be closed by an AND gate 84 in response to the signals $\overline{M1}$ and RO at logic 1.

Accordingly, during the readout mode of operation when the signal RO is present, either the contents of the register ASR1 or the contents of the register ASR2 are delivered to the amplifier 77 depending on the state of the mode flip flop 43 in FIG. 5. The signals at the active output terminal of the amplifier 77 are supplied to a low pass filter 85, wherein high frequency switching transients are discarded, and the audio signal output produced by the filter 85 is applied to the active input terminal of a conventional audio amplifier 86, and from its active output terminal to the record head ARH.

The first sample gating signals T11 for the register ASR1 are produced as logic 1 pulses at the output terminal of an OR gate 87. The gate 87 has three input terminals, one receiving the signal RO1, a second receiving the signal ADA, and the third receiving a logic 1 signal when an AND gate 88 produces a logic 1 output signal in response to the simultaneous presence of the signals SC1 and RI1.

Immediately following each such pulse T11 produced by the gate 87, a corresponding transfer pulse T12 is produced by an OR gate 89. For this purpose, the gate 89 has three input terminals. One of these receives a logic 1 signal from the output of an AND gate 90 in response to the presence of logic 1 signals SC2 and RI1. This pulse thus produced by the gate 90 corresponds to the pulse produced by the gate 88 and follows that pulse.

A second input terminal of the gate 89 receives the output signal from an AND gate 91. This AND gate 91 produces a logic 1 output signal in response to the signals RUN 1, FC2 and M1. This signal follows each pulse ADA supplied to the gate 87.

The third input terminal of the gate 89 receives the output signal from an AND gate 92. This AND gate receives the signals R0, M1 and FC2. Accordingly, the gate 92 produces a pulse following each pulse RO1 applied to the gate 87.

As noted above, for some purposes, it may be desirable to form the signals such as T12 simply as the complements of the signals such as T11. This can be done by applying the signals T11 to an inverter.

Briefly, the timing signals T11 and T12 produced in response to logic 1 signals produced by the gates 88 and 90 occur during the strobing into the register ASR1 of samples DI1 of the signal from the recording amplifier 74 at the time when the register AST1 is storing a train of signals representing currently recorded audio data.

The signals T11 produced by the gate 87 in response to the signals ADA correspond to signals T21 produced just following those signals by the gate 91. These signals are produced in the runout mode when data is being advanced to the last stage to the right in the register ASR1 just before it is to be recorded by the head ARH. Finally, signals T11 produced by the gate 87 in response to the pulses RO1 just precede signals T21 produced by the gate 92. These signals are produced during the reading out of information from the register ASR1 to the recording head ARH when the switch 78 is closed by a logic 1 signal appearing at the output terminal of the gate 81.

Sample timing signals T21 and T22 are produced for the register ASR2 at times corresponding to the production of the signals T11 and T12 under the conditions when the register ASR2 is performing the functions of the register ASR1 described above. In particular, when the signal $\overline{RI1}$ is present and analog samples DI2 are being applied to the register ASR2 over the closed switch 76, samples DI2 are taken into the register ASR2, and previously taken samples are transferred down the register, by pulses T21 produced by an OR gate 93 in response to logic 1 pulses produced by an AND gate 94 in response to the presence of the signals SC1 and $\overline{RI1}$. Corresponding following signals T22 re produced by an OR gate 95 in response to logic 1 pulses produced by an AND gate 96 in the presence of the signals SC2 and $\overline{RI1}$.

During the runout mode of the register ASR2, when signals are being advanced to the end as described above and to be described in more detail below, pulses T21 are produced by the gate 93 in response to the signals ADB. Corresponding following pulses T22 are produced by the gate 95 in response to logic 1 pulses appearing at the output terminal of an AND gate 97. The gate 97 produces a logic 1 signal in response to the presence of logic 1 signals RUN 1, FC2 and $\overline{M1}$.

The signals T21 which advance the contents of the register ASR2 when that register is connected to the audio amplifier 86 are produced by the gate 93 in response to pulses RO2. Corresponding following signals T22 are produced by the gate 95 in response to logic 1 signals supplied by an AND gate 98. The gate 98 produces a logic 1 signal in response to the pulses R0, $\overline{M1}$ and FC2.

Figure 7:
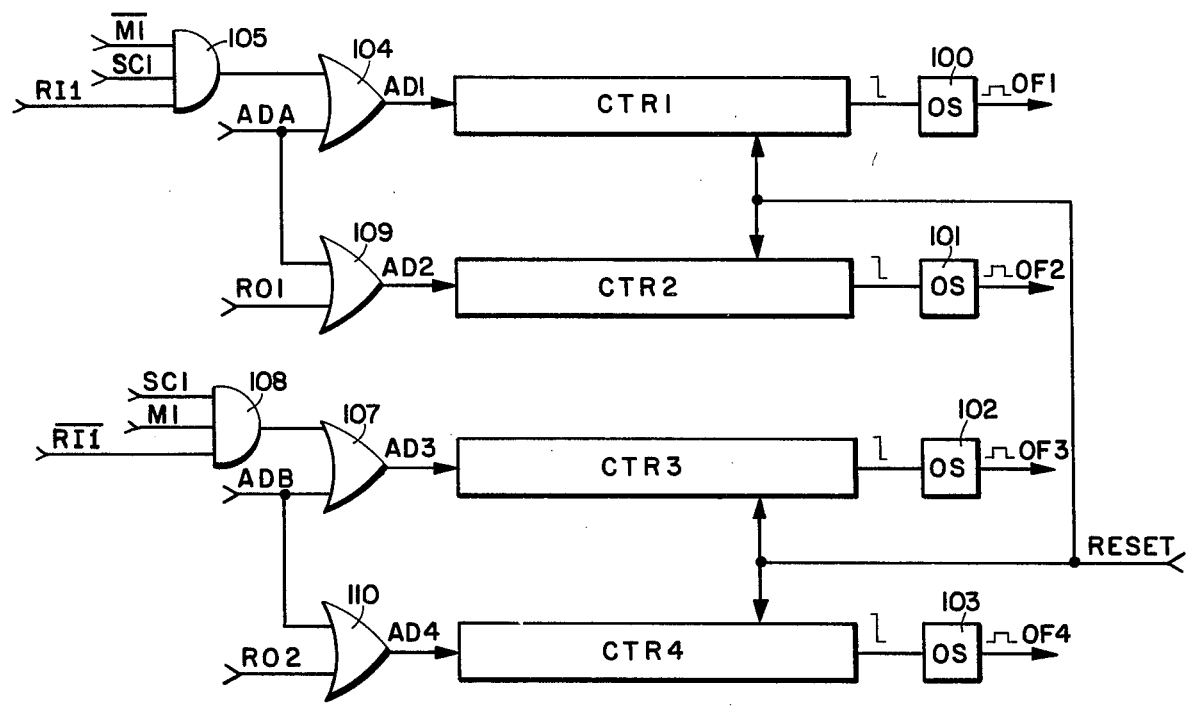
FIG. 7 is a schematic block and wiring diagram of counter circuits forming a portion of the camera of FIG. 1.

FIG. 7 shows tracking counter circuits which keep account of what is going on in the registers ASR1 and ASR2, and direct the exchange of functions of the registers at the appropriate times. The apparatus includes four counters CTR1 through CTR4, each of which may be a conventional ten-stage binary counter for use with analog shift registers having a sample capacity of 1024 different samples.

Each of these counters is adapted to be reset to a zero state by the RESET pulse produced in the manner described above. Each counter is adapted to be advanced one count by advance signals for the counter CTR1, AD2 for the counter CTR2, AD3 for the counter CTR3 and AD4 for the counter CTR4.

When any of the counters CTR1 through CTR4 has been cycled through all of its states and is reset to the zero state, the transition produced as this action occurs, with the counter automatically returning to its zero state, triggers a conventional one-shot multivibrator to produce an overflow pulse. In particular, overflow of the counter CTR1 triggers a one-shot multivibrator 100 to produce an overflow pulse OF1. Similarly, overflow of the counter CTR2 triggers a one-shot multivibrator 101 to produce a pulse OF2, overflow of the counter CTR3 triggers a one-shot multivibrator 102 to produce a pulse OF3, and overflow of the counter CTR4 triggers a one-shot multivibrator 103 to produce a pulse OF4. These pulses may be quite short, as they are merely required to unconditionally reset the flip flop 54 or 60 depending on the current mode in which the counter is being run out.

Briefly, one of the counters CTR1 and CTR3 selected by the mode flip flop 43 as determined by the presence of the level M1 or $\overline{M1}$, is run out to overflow just after the associated register ASR1 or ASR2 has been taken out of the readin mode to advance the contents of the register ASR1 or ASR2 to the end. At the same time, the count pulses supplied to the counter CTR1 or CTR3 until it overflows are supplied as advance counts to the associated counter CTR2 or CTR4, to register the difference between the number of samples actually stored during the frame interval and the capacity of the register.

During readout of information onto the record heads ARH and BRH, one of the counters CTR2 or CTR4, selected by the mode flip flip 43 in FIG. 5, is advanced to run out, and when it overflows ends the readout mode as that number of counts required to advance the selected counter CTR2 and CTR4 represents the number of actual data samples that are to be read out. This mode of operation will be somewhat amplified during the description of operation of the system as a whole.

More particularly, entry of samples into the analog storage register ASR1 in FIG. 6 when the signal RI1 is present are tracked by the counter CTR1 in response to the signals AD1 produced by an OR gate 104 in response to logic 1 pulses produced by an AND gate 105 in the presence of the signals $\overline{M1}$; SC1 and RI1. When the signal M1 is present, corresponding pulses AD3 are supplied to the counter CTR3 from an OR gate 107 in response to the logic 1 pulse as produced by an AND gate 108. The gate 108 receives the signals SC1, M1 and $\overline{RI1}$.

After the number of each group of samples has been entered into the counter CTR1 by the gates 104 and 105 in the manner just described, the counter is advanced to overflow by ADA pulses applied to gate 104. The ADA pulses also advance the counter CTR2, through an OR gate 109. Correspondingly, after tracking data samples as directed by the gate 108, the counter CTR3 is advanced to overflow by pulses ADB, produced as described, applied to the OR gate 107. The same pulses ADB are applied to advance the counter CTR4 through an OR gate 110.

Readout of samples to the recording heads ARH and BRH is tracked by the counter CTR2 when pulses RO1 are applied to the OR gate 109. Correspondingly, the counter CTR4 tracks readout pulses when pulses RO2 are applied to the gate 110.

Having thus described the camera and its recording system, the mode of operation of the system will next be described with reference to FIGS. 1 through 7.

Referring first to FIGS. 1 and 2, assume first that the camera 1 is loaded with film 8 that is initially unexposed and disposed primarily on a supply reel 9. With reference to FIGS. 1 and 5, assume that both the grip switch GS and the trigger switch TS are open.

Assuming that the operator now picks up the camera bythe grip 3 and closes the grip switch GS, the first occurrence will be the appearance of the potential B+ that will supply power to the apparatus. In particular, the lamps K1 and K2 will be lit, and the photodiode D2 will be illuminated with the shutter. Referring to FIG. 3, the initial state of the apparatus will be assumed to be that in which the trailing edge 30 of the shutter aperture is stopped by the detent 32.

The one-shot multivibrator 41 in FIG. 5 will initially be triggered to produce a pulse S2P. The clock oscillators SCO1 and FCO1 will be turned on, causing the pulses SC1, SC2, FC1 and FC2 to be produced. During the interval between the closure of the grip switch GS and the closure of the trigger switch TS to begin photographic operations, various of the registers may be cycled. However, it is not considered essential to trace the various operations which may occur in detail, because it is obvious that nothing will be recorded on the film 8 until the motor 21 is started by the potential OP+ produced when the trigger switch TS is closed.

Regardless of the states of the various registers when the trigger switch TS is next closed, the one-shot multivibrator 47 will produce the start pulse, and the potential OP+ will start the motor 21 to move the shutter into the position in which the photodiode PD1 is exposed to the lamp K1. The one-shot multivibrator 42 will now be triggered to produce a pulse S1P. That will cause the gate 48 to produce a negative transition, triggering the one-shot multivibrator 49 to produce the RESET pulse that will set all registers intially to their count zero or reset states.

The leading edge of the pulse S1P will change the state of the flip flop 43. Assuming, for example, that this flip flop was initially in the set state, the first transition will reset the flip flop to the state $\overline{M1}$. With the signal $\overline{M1}$ present, and during the pulse S1P, a first occurrence of a slow clock pulse SC2 will cause the AND gate 53 to supply a logic 1 gate to the AND gate 51, which also receives the signal $\overline{M1}$. The flip flop 50 will now be set to produce the signal RI1. During the pulses S1P and SC2, the first occurring fast clock pulse FC2 will cause the gate 55 to set the flip flop 54, producing the signal RUN 1.

After the leading edge 31 of the shutter 25 in FIG. 3 has uncovered the lamp K1 to produce the pulse S1P as described above, it will begin to uncover the lens 13 to start an exposure. Referring to FIG. 4, assume that the frame F1 is in the exposure station when operation begins. Sometime during this exposure, the trailing edge 30 of the shutter 25 will interrupt the light from the lamp K2 to the photodiode PD2, causing a rising transition at the junction of the diode PD2 and the resistor 39. This transition will have no effect on the multivibrator 41, because it is in the wrong direction for triggering.

Returning to the sequence of events at the point where the flip flop 50 is set to produce the level RI1, and the flip flop 54 is set to produce the level RUN 1, and turning next to FIG 6, the analog shift register ASR1 will now be connected to the output terminal of the amplifier 74 with the switch 75 in its closed state. As long as the signal RI1 persists, data will be copied from the microphone as samples into the register ASR1 by pulses T11 produced by the gate 88 at each slow clock pulse SC1, producing a pulse T11 through the gate 87. Following each such pulse T11, a pulse T12 will be produced by the gates 90 and 89. As this action will continue until the next pulse S1P, attention may next be directed to FIG. 7. With the signal RI1 present and the signal $\overline{M1}$ present, at each pulse Sc1 which is copying data into the register ASR1 in the manner just described, the gate 105 in FIG. 7 will produce pulses applied through the OR gate 104 to produce advance signals AD1 to step the counter CTR1. The counter CTR1 thus follows each entry of data into the register AR1 during this mode of operation.

At the same time, referring again to FIG. 5, with the signal RUN 1 present, at each FC1 pulse the gate 56 will produce a pulse AD. With the signal $\overline{M1}$ present, the gate 58 will now produce ADB pulses at each FC1 time.

Referring again to FIG. 7, these signals ADB will advance the counter CTR3 at each occurrence of the fast clock pulse FC1. At the same time, the counter CTR4 will be advanced by pulses produced in response to the pulses ADB by the gate 110.

Since the counters CTR 3 and CTR4 have been reset to zero by the reset pulse, this operation will continue over the full cycle of the counters CTR3 and CTR4, until both counters overflow simultaneously to trigger the one-shot multivibrators 102 and 103 to produce the signals OF3 and OF4. Because the fast clock pulses FC1 occur approximately three times as often as the pulses SC1, these pulses will be produced well before the time that the next S1P is produced.

Referring to FIG. 5, the pulse OF1 will reset the flip flop 54 through the OR gate 59. The level RUN 1 will thus be removed. The overflow pulse OF4 will be applied to the gate 73, but since the flip flop 60 is already reset as described above, that will not produce any effect on the flip flop.

Following the exposure of the first frame, the pawl 23 will begin to pull down the film to the next frame exposure position. When the speed of the film reaches a sufficient level for recording, the leading edge 31 of the aperture in the shutter 25 in FIG. 3 will uncover the lamp K2, illuminating the photodiode PD2 in FIG. 5. That will produce a falling transition. Triggering the one-shot multivibrator 41 to produce the pulse S2P.

With the pulse S2P present, the first fast clock pulse FC2 will set the flip flop 60 through the AND gate 65. That will produce the readout level R0, enabling the gate 66 to produce clock pulses ROC at each FC1 pulse. With the level $\overline{M1}$ present, the gate 68 will now begin to produce pulses RO2 for each FC1 pulse.

Referring to FIG. 4, the frame F1, which originally was exposed in the exposure station, is now being pulled down toward the position shown in FIG. 4, while frame F0 is sweeping the heads ARH and BRH, at a speed fast enough for proper recording. For each pulse ROC produced by the gate 66 described above, the NAND gate 69 will trigger the multivibrator 70, and the trailing edge of the pulse produced by that multivibrator will trigger the multivibrator 71 to produce a delayed clock pulse ROCD applied by the amplifier 72 to the clock track recording head BRH. This action will locate a clock pulse on the clock track 35 alongside frame F0 in the appropriate location for an audio sample to be recorded on the audio track 34. However, as will appear, no corresponding audio signal will be recorder adjacent frame F0.

Referring to FIG. 6, with the levels $\overline{M1}$ and RO present, the gate 84 will close the switch 83, connecting the output signal from the shift register ASR2 through the summing resistor 82 to the input junction of the amplifier 77. At each pulse RO2, the gate 93 will produce a pulse T21 to advance the contents of the register ASR2 when stepped one stage to the right. Corresponding pulses T22 will be produced by the gates 98 and 95 at FC2 time. At the same time, referring to FIG. 7, the clock pulses RO2 will advance the registers CTR4.

As there has initially been no data recorded in the register ASR2, and the counter CTR4 has initially been set to its reset state, the counter CTR4 will now overflow until the full complement of 1024 pulses has been entered into it by corresponding clock pulses RO2. During this interval, since there was nothing stored in register ASR2, nothing will be written by the record head ARH on the audio track 34, although clock pulses will be recorded by the head BRH. In view of the location of the heads shown in FIG. 4, this line of zero data will be written on frame F0 as this unexposed frame is swept past the record heads ARH and BRH.

Referring again to FIG. 7, when the counter CTR4 is advanced to overflow, the one-shot multivibrator 103 will produce a pulse OF4. Turning to FIG. 5, that pulse will reset the flip flop 60 through the gate 73 and remove the level RO, causing the readout operation to be terminated. The shift register ASR1 continues to take in data during this interval at SC1 times, and the register ASR2 is waiting. The counter CTR1 is tracking this storage of samples at SC1 time, being advanced by the gates 105 and 104.

If the motor 21 in FIG. 2 is moving at the slowest speed which the system is allowed to reach, the counter CTR1 will receive a full count just as the next pulse S1P is produced. Alternatively, if the motor 21 is moving as fast as it is allowed to do, a lower count will be reached by the counter CTR1. For example, allowing ± five percent deviation from a twenty frame per second filming rate, there may be anywhere from about 920 to 1024 samples stored in the register ASR1 during the interval before the next pulse S1P is produced.

As discussed above, when the next pulse S1P is produced, the state of the flip flop 43 will be changed and the level M1 will now be produced. With the level M1 present during the pulse S1P, the first slow clock pulse SC2 to be produced will reset the flip flop 50 through the gates 53 and 52. The level RI1 will now disappear and the level $\overline{RI1}$ will be produced.

During this same interval, at the first fast clock pulse FC2, the gate 55 will set the flip flop 54 to produce the signal RUN 1. That will enable the gate 56, and, with the level M1 present, the gate 57, to begin to produce the pulses ADA to run out counter CTR1 in FIG. 7 through the gate 104, and to store a count in counter CTR2 through the gate 109 representing the difference between the maximum contents of the counter CTR1 and the number of samples actually stored in it during the storage cycle just described.

At the same time, the contents of the analog storage register ASR1 in FIG. 6 will be advanced until the first storage sample is in the last stage to the right, and corresponds to the signal DO1 then appearing at the output of the shift register ASR1. When the counter CTR1 in FIG. 7 runs out, the multivibrator 100 will produce the signal OF1 that will terminate the runout mode by resetting the flip flop 54 through the gate 59.

When the level $\overline{RI1}$ was first produced, referring to FIG. 6, the analog storage register ASR2 was connected to the output terminal of the recording amplifier 74 by closing the switch 76, allowing samples of the signal to be recorded into the register ASR2 at SC1 time through the gates 94 and 93. Corresponding T22 pulses are produced, following each T21 pulse that thus enters a sample in the register ASR2, by means of the gates 96 and 95. During this time, the register ASR2 is accumulating the audio information that will subsequently be recorded adjacent frame 2 of the film 8 in FIG. 4.

Shortly after the pulse S1P has started the chain of events just described, frame 2 will begin to be exposed by the shutter 25 in FIG. 3. Following this exposure, the shutter 25 will close the lens aperture, and film pull-down will begin.

When the film reaches an appropriate speed, the pulse S2P will be produced by the illumination of the photodiode PD2, which will trigger the multivibrator 41 to produce a pulse S2P. This pulse will cause the flip flop 60 to be set at FC2 time by the gate 65, producing the level RO.

A line of audio information to be recorded on frame 1 is now stored in the shift register ASR1. The tracking counter CTR2 has been advanced by a number of counts representing the difference between the maximum contents of the counters CTR1 and CTR2 and the number of samples actually stored in the register ASR1, and the audio samples have been advanced to the right end of the register ASR1.

During the readout mode, when the signal RO1 is present, the contents of the shift register ASR1 will be strobed out to the audio amplifier 86 to be recorded by the head ARH on track 34 adjacent frame F1. Corresponding clock pulses ROCD will be recorder on the track 35 by the head BRH.

As the information is strobed out of the register ASR2 to the audio amplifier 86 for this purpose, the counter CTR2 is tracking it with each pulse RO1. Since this register has previously been loaded with difference between the total capacity and the number of samples actually present, it will overflow to produce the pulse OF2 just after the recording of the last of these data samples is accomplished. That will reset the flip flop 60 in FIG. 5, terminating the readout cycle.

The registers ASR2, CTR3 and CTR4 will then wait for the next pulse S1P, which they will begin to accumulate data to be recorded adjacent frame 3 and the data for frame 2 will be stored in the register ASR2. It is believed that the above description of operation will be adequate to enable the reader to follow the sequence of events during which audio data associated with each frame is successively recorded on the side of the film adjacent the frame.

Figure 8:
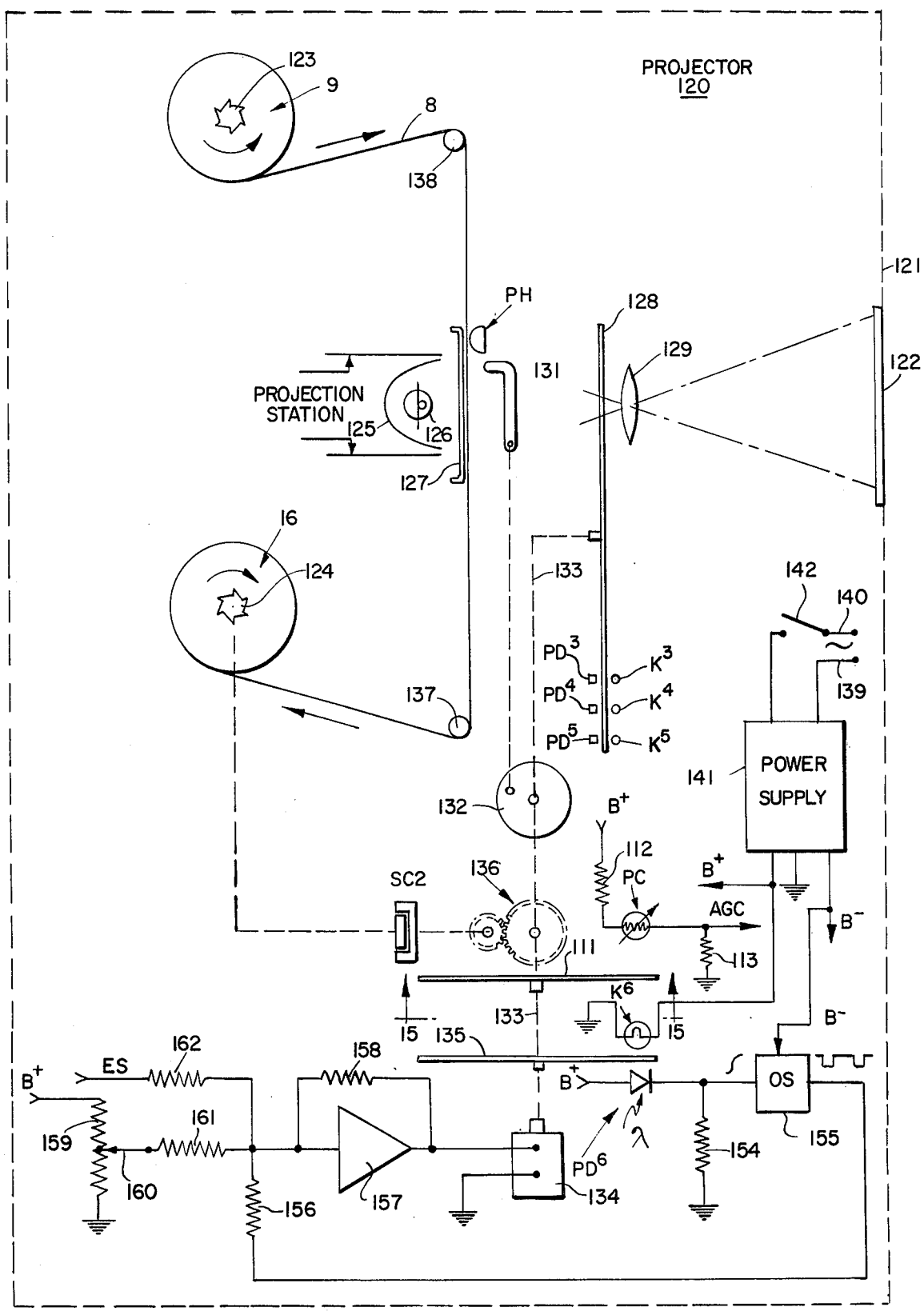
FIG. 8 is a schematic block and wiring diagram, with parts omitted, showing significant elements of a projector adapted for use in the system of the invention.

Having described the camera recording system in accordance with the invention, a projector and playback system adapted for use with film on which pictures and sound have been recorded in the manner just described will next be described. Referring first to FIG. 8, the pertinent elements of a projector 120 are shown.

The projector 120 may be provided with any suitable conventional housing 121, in which there is placed a viewing screen 122 of any conventional kind upon which photographic images can be projected and seen by an external observer. Obviously, if so desired, an external screen of any conventional kind could be employed instead of the integral screen.

The projector 120 is provided with any conventional sprockets 123 and 124 adapted to receive the supply reel 9 and take-up reel 16 carrying the film 8 of FIG. 2, which is now assumed to have been exposed, recorded and processed. The film 8 is also assumed to have been rewound primarily onto the supply reel 9, in any conventional fashion.

The projector 120 is provided with a projection station comprising a suitable reflector 125 directing light from a suitable projection lamp 126 through a framing aperture in a conventional pressure plate 127. By this arrangement, during appropriate intervals established by a shutter 128, to be described, an image formed on the film 8 can be focused by a conventional lens 129 on the screen 122.

During an interval between such exposures, the film is pulled down to the next frame by a conventional claw mechanism comprising a film drive pawl 131 which pulls a frame down to bring the next frame into projection position during approximately one-seventh of a frame cycle. For this purpose, the pawl 131 is controlled by any conventional means schematically indicated as a cam 132 driven by the output shaft 133 of a conventional DC motor 134. The projector motor 134 requires a speed control system that is regulated in a manner to be described.

The shaft 133 of the motor 134 also drives a speed feedback control disc 135, which serves in the speed control system for the motor 134 in a manner to be described below. Another element driven by the shaft 133 is a disc 111, which forms a part of an automatic gain control system to be described below.

As in the camera, the drive sprocket 124 for the take-up reel 16 is driven by the motor 134, through speed increasing gearing suggested at 136, and a slip clutch SC2 that serves to attempt to bring the film past the film gate at a rate greater than it is actually advanced by the film drive claw 131. A snubber roll 137 cooperates with the slip clutch SC2 in a known manner to cause film advance only during pulldown movements of the pawl 131.

As in the camera, an idler 138 is included in the film path to keep the film in a straight line in its movement past the projection station despite changes in the radius of the film on the reels 9 and 16.

The projector 120 is assumed to be supplied with power from a conventional 120 volt, 60Hz alternating current source, applied in any conventional manner to input terminals 139 and 140. A conventional power supply 141 is energized from these terminals when an ON-OFF switch 142 is closed. When the switch is closed, DC power supply potentials B+ and B− with respect to ground are produced by conventional means.

Figure 9:
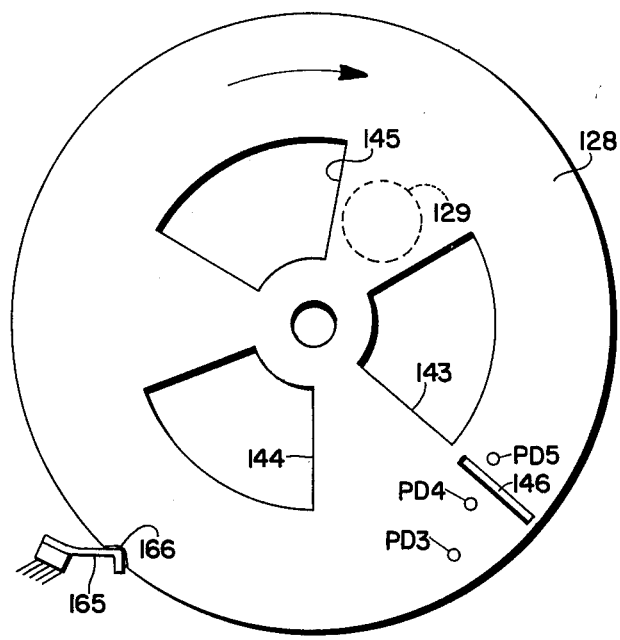
FIG. 9 is a schematic view, taken along the lines 9—9 in FIG. 8, of the shutter and certain sensing elements in relation to the projecting lens in the projector of FIG. 8.
Figure 11:
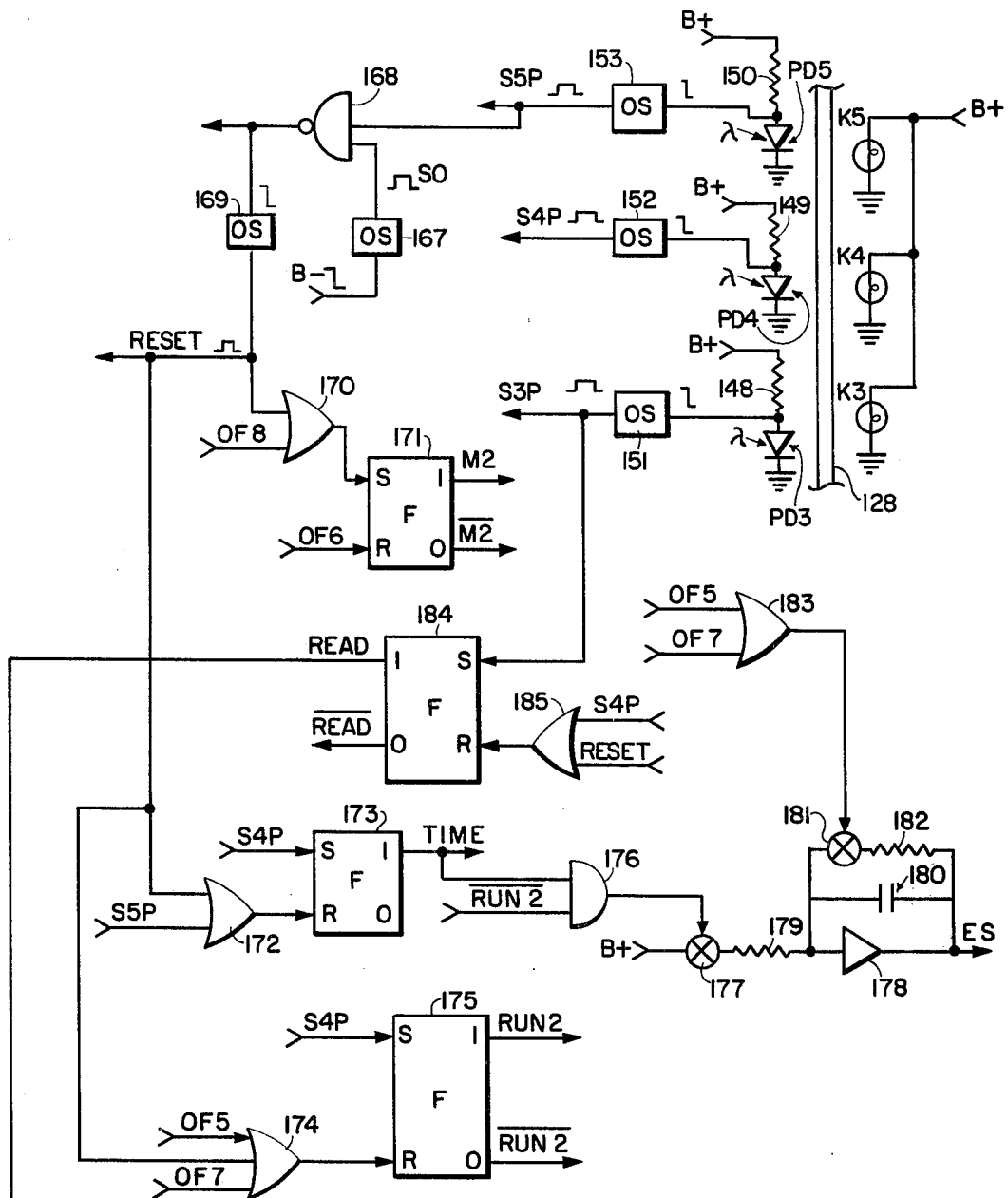
FIG. 11 is a schematic block and wiring diagram of timing circuits forming a part of the projector of FIG. 8, illustrating certain portions of the timing apparatus partly shown in FIGS. 8 and 9 in more detail, but essentially along the lines 11—11 in FIG. 9.

Comparing FIGS. 8, 9 and 11, the shutter 128 is provided with three substantially symmetrical projection apertures 143, 144 and 145, each occupying substantially 70 degrees of the rotation of the shutter 128. The shutter 128 is shown in FIG. 9 in the position just before it exposes the aperture of the lens 129 for the first of a series of three such exposures that are made during each cycle of rotation of the shutter 128. The shutter 128 makes one such revolution each one-twentieth of a second for a twenty frame per second projection rate.

A timing aperture comprising a slot 146 is formed in the outer edge of the shutter disc 128 beyond the lens exposing apertures 143, 144 and 145. During the rotation of the shutter, this aperture 146 sequentially exposes a series of photodiodes PD3, PD4 and PD5, schematically indicated in FIGS. 8 and 9, and shown in more detail in FIG. 11.

Referring to FIG. 11, and comparing it with FIG. 9, as the aperture slot 132 exposes the photodiode PD5, a lamp K5 illuminates the photodiode through the aperture. Similarly, a lamp K4 illuminates the diode PD4 through the aperture 132 in another rotated position of the shutter 128, and a lamp K3 illuminates the photodiode PD3 through the aperture 132 in still another rotated angle of the shutter 128.

The lamps K3, K4 and K5 are arranged to be energized by circuits extending from the supply terminal at B+ to ground. As indicated in FIG. 11, one such circuit extends from the supply terminal at B+ through a circuit limiting resistor 148 and thence through the photodiode PD3 to ground. Similarly, a circuit extends from the supply terminal at B+ through a current limiting resistor 149 and the photodiode PD4 to ground. The third such circuit extends from the supply terminal at B+ through a current limiting resistor 150 and thence through the photodiode PD5 to ground.

The junction of the resistor 148 and the photodiode PD3 is connected to the active input terminal of a conventional one-shot multivibrator 151, which is triggered when the photodiode PD3 is first illuminated to produce a pulse labeled S3P. Similarly, a one-shot multivibrator 152 is triggered when the photodiode PD4 is illuminated to produce a pulse labeled S4P. A one-shot multivibrator 153 is triggered when the photodiode PD5 is illuminated to produce a pulse labeled S5P. These pulses are used to control the timing of the apparatus in a manner that will be described below.

Figure 10:
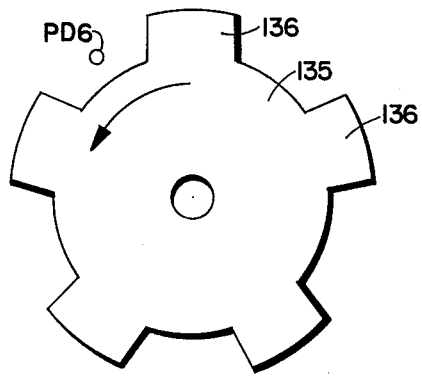
FIG. 10 is a schematic sketch, taken along the lines 10—10 in FIG. 8, with parts omitted, of a signal generator for use in the apparatus of FIG. 8.

Referring again to FIG. 8, when the switch 142 is closed and the supply terminal at B+ is energized, a lamp K6 is illuminated. Comparing FIGS. 8 and 10, the disc 135 comprises a plurality of blades 136 that sequentially block and then expose an optical path between the lamp K6 and a photodiode PD6.

The photodiode PD6 is connected in a circuit extending from the supply terminal at B+ through the photodiode PD6 and thence to ground through a current limiting resistor 154. Thus, as the disc 135 is rotated by the shaft 133 of the motor 134, the photodiode PD6 is sequentially illuminated and not illuminated, for example, five times for each revolution of the shaft 133. Each time the photodiode PD6 is thus illuminated, a rising transition is produced at the junction of the photodiode and the resistor 154. This junction is connected to that input terminal of a conventional one-shot multivibrator 155 that is arranged to produce a pulse of fixed duration that is negative with respect to ground when triggered by a rising transition. Since the energy in each pulse is thus fixed, and the interval between them is determined by the speed of operation of the motor 134, the average negative voltage represented by the train of pulses produced by the multivibrator 155 is proportional to the speed of the motor. As schematically indicated, the one-shot multivibrator 155 is supplied with a potential B− with respect to ground to enable these pulses to be produced.

The pulses from the multivibrator 155 are applied through a summing resistor 156 to the active input terminal of a conventional servomotor amplifier 157. The amplifier 157 is indicated as having a feedback resistor 158 to provide degenerative feedback in a known manner.

A potentiometer comprising a resistive element 159 and a wiper 160 is provided. This potentiometer has its resistive element connected between the supply terminal at B+ and ground, and its wiper connected through a second summing resistor 161 to the active input terminal of the amplifier 157. The wiper 160 is selected to produce a reference potential input to the amplifier 157 which balances the negative input average current supplied through the summing resistor 156 when the motor 134 is running at a speed corresponding to the minimum speed allowed in the camera; i.e., if the minimum speed of the camera corresponds to five percent less than twenty frames per second, that would be the speed produced by the signal components supplied to the amplifier 157 through the summing resistors 156 and 161 in the absence of any other input. An error signal input ES, producing an average positive current input to the amplifier 157, is supplied through a third summing resistor 162. The error signal ES is varied in a manner to be described to cause the projector to track the camera frame rate.

Referring next to FIG. 9, when the projector 142 is turned off by opening the switch 142, or in any other manner provided in the conventional way to stop the projector when the end of the film is reached on the supply reel 9, it is desired to stop the apparatus in a position of the shutter 128 relative to the lens aperture 129 such that the optical projection path is blocked, and also to arrange the parts so that the aperture 146 will first expose the photodiode PD5 when the motor is started. For this purpose, a detent is schematically indicated as a spring biased element 165 connected to the frame of the projector, and engaging a suitable notch 166 formed in the edge of the shutter 128. Obviously, this detent, as well as the one described above in connection with the camera shutter, could be located elsewhere in the drive train, and take any conventional form.

Figure 15:
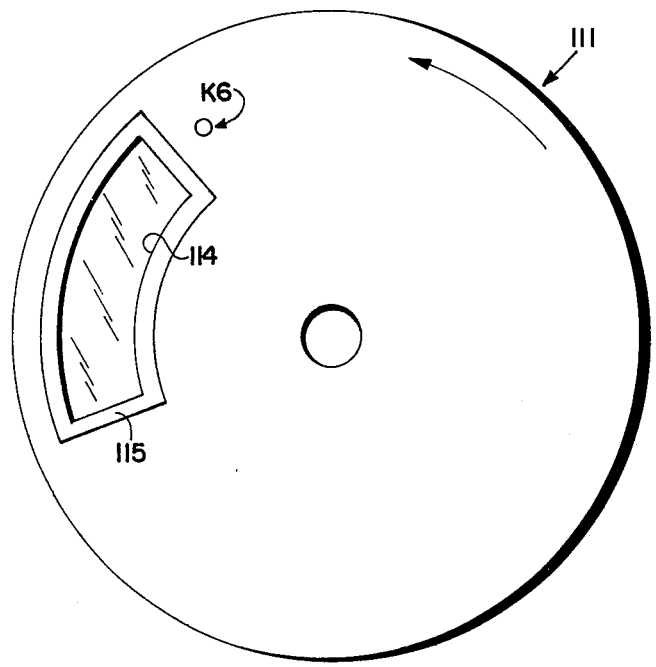
FIG. 15 is a schematic view of a gain control disc in FIG. 8, taken along the lines 15—15 in FIG. 8.

Comparing FIGS. 8 and 15, the disc 111 driven by the shaft 133 at times blocks an optical path between the lamp K6 and a photocell PC. A circuit extends from the supply terminal at B+ through a current limiting resistor 112, through the photocell PC, and thence through a resistor 113 to ground.

The resistor 113 has a resistance that is small compared to the sum of the resistances of the resistor 112 and the photocell PC when the photocell PC is not exposed to light. For example, the components may be selected by conventional methods so that the voltage appearing across the resistor 113 varies from approximately zero volts when the photocell PC is not illuminated by the lamp K6 to about four volts when the lamp K6 fully illuminates the photocell PC. This voltage, labeled AGC, is used to control the gain of the playback preamplifier, to be described below in connection with FIG. 12.

As shown in FIG. 15, the disc 111, which may be of sheet metal, an opaque plastic, or the like is formed with an aperture 114. Over the aperture 114 is cemented, or otherwise secured, a variable neutral density filter 115. The lamp K6 and the photocell PC are located relative to the aperture 114 so that the photocell PC is exposed to the lamp K6 through the filter 115 somewhat before, and during, pulldown of the film 8 in the projector.

The filter 115 has a density distribution such that it transmits an amount of light proportional to the speed of the film 8 during pulldown. This density gradient can be obtained in any conventional manner. For example, a photographic negative can be exposed by a light source while the negative, or the light source, is moved either by the pawl 131, or by any other mechanism with the same velocity profile. The negative, so exposed, when processed by conventional methods will have a density gradient from a high density, at low speed of the pawl, to a low density at the highest pawl speeds. A positive transparency made from such a negative by appropriate conventional methods will have the proper density gradient for use as the filter 115.

Referring next to FIG. 11, the basic timing circuits for the control system of the projector 120 of FIG. 8 will next be described. As a preliminary, comparing FIGS. 9 and 11, as the shutter 128 begins to rotate in the direction shown by the arrow from the position engaged by the detent, operation will start just after a pulldown cycle, and just before a projection cycle.

The first event will be the production of the pulse S5P by the illumination of the photodiode PD5. This may occur slightly after the first projection exposure has been begun by the aperture 143. That exposure will continue, a dark interval will follow, a second exposure will be made by the aperture 144, a dark interval will follow, and a third exposure of the same frame will be made by the aperture 145.

During the succeeding dark interval, the aperture 146 will first expose the photodiode PD3, producing the pulse S3P in FIG. 11. This pulse signals a period during pulldown at which the film is moving sufficiently fast for readout to begin. The next event during pulldown is the exposure of the photocell PD4, indicating that it is too late in the movement of the film towards its new rest position to reproduce data recorded on the audio tracks. Finally, the photodiode PD5 will be illuminated again, to produce the pulse S5P. This pulse is used to end the timing interval and functions in the speed control circuit in a manner to be described.

With this sequence of pulses in mind, and referring again to FIG. 11, at the beginning of operations when the supply potential at B− is first produced, a one-shot multivibrator 167 will be triggered to produce a positive pulse labeled SO, having a duration sufficient to insure that the exposure of the photodiode PD5 through the aperture 146 in FIG. 9 will have occurred. The simultaneous presence of the pulse SO and the pulse S5P at the input terminals of a conventional NAND gate 168 cause a falling transition to be produced at the output of the NAND gate 168 that will trigger a one-shot multivibrator 169 to produce a short pulse labeled RESET. The RESET pulse is used in a manner that will described to initially set all of the registers in the system, to be described, to a reset or reference state. In particular, the RESET pulse is applied to one input terminal of an OR gate 170 to set a flip flop 171, producing a level M2. A second input terminal of the gate 170 receives a pulse labeled OF8, produced at times to be described when a counter overflows.

The flip flop 171 is reset by a pulse OF6, produced in a manner to be described upon the overflow of a counter. The state of the flip flop 171 determines which of a pair of analog shift registers is connected to supply signals to a speaker provided in the projector, as will appear.

The RESET pulse is also applied to one input terminal of an OR gate 172 to reset a flip flop 173 to be sure that a level TIME is removed. This flip flop will be reset at other times by the signal S5P applied through the gate 172 to the reset input terminal of the flip flop 173.

The flip flop 173 is set toward the end of pulldown by the pulse S4P. That produces the level TIME, which is present between S4P time and S5P time. The signal TIME is used in the circuit that produces the motor control signal ES, in a manner to be described.

The reset pulse is also applied to one input terminal of a conventional three input terminal OR gate 174 to reset a flip flop 175 to produce the signal $\overline{\text{RUN 2}}$. This flip flop is reset at other times by the gate 174 in response to either of two counter overflow pulses OF5 and OF7, produced in a manner to be described below.

The flip flop 175 is set by the pulse S4P at the same time that the flip flop 173 is set. The signal RUN 2 produced by this flip flop when it is set marks an interval during which data is advanced to the end of an analog shift register, and during which a tracking counter is advanced. This interval is compared with the TIME interval to form the motor control signal ES.

In particular, the signals TIME and $\overline{\text{RUN 2}}$ are applied to the input terminals of an AND gate 176. A logic 1 signal at the output terminal of the gate 176 closes a normally open electronic switch 177 to connect the supply terminal at B+ to a conventional "integrate and hold" circuit.

The integrate and hold circuit comprises an operational amplifier 178 having an input resistor 179 connected between its active input terminal, and, over the load terminals of the switch 177, to the supply terminal at B+. A capacitor 180 connected in a degenerative feedback path between the active input and output terminals of the amplifier 178 serves to integrate the supply voltage when the switch 177 is closed, and at other times to store a voltage representing the integral. This stored voltage, labeled ES, is a measure of the time between the appearance of the signal $\overline{\text{RUN 2}}$ and the disappearance of the signal TIME. A large value of the signal ES directs an increase in the speed of the motor 134 in FIG. 8, and reflects the fact that the projector motor is currently running more slowly than the camera motor did during recording. Conversely, a low value of the voltage ES indicates that the projector motor is moving faster than the camera motor did, and directs a lower speed.

The amplifier 178 has a second feedback path that extends from the active input terminal of the amplifier over the load terminals of a normally closed electronic switch 181, and thence through a current limiting resistor 182 to the active output terminal of the amplifier 178. The switch 181 is briefly closed, by a logic 1 signal appearing at the output terminal of an OR gate 183, when either of two counter overflow pulses OF5 or OF7 is produced in a manner to be described below. This action serves to reset the integrate and hold circuit, by discharging the capacitor 180, just before the switch 177 is closed by the appearance of the signal $\overline{\text{RUN 2}}$ during the occurrence of the signal TIME. If needed, a delay in the output signal from the gate 176, as by the use of circuits such as those used to produce the signal ROCD described above, can be included to ensure that the capacitor 180 is discharged before the next integration cycle is started.

Another function of the RESET pulse is to clear a flip flop 184 to its reset state. This function is performed by applying the RESET pulse to one input terminal of an OR gate 185 that has its output terminal connected to the reset input terminal R of the flip flop 184.

A second input terminal of the flip flop 184 receives the pulse S4P. In response to either of the pulses RESET or S4P, the flip flop 184 accordingly produces the level READ. The flip flop 184 is set, to produce the level READ, by the pulse S3P. The duration of the signal READ thus marks the interval during which the film 8 is being moved during pulldown at a speed sufficient for reproduction of audio signals recorded on the sound tracks 34 and 35.

During the interval when the READ level is present, a NAND gate 186 is enabled to produce a falling transition at its output terminal in response to a positive pulse applied to a second input terminal by the active output terminal of a conventional preamplifier 187 The preamplifier 187 has input terminals connected to receive signals produced by a playback head BPH, of any conventional design, arranged to reproduce clock signals recorded on the track 35 of the film 8 by the head PRH.

At each positive pulse produced by the amplifier 187 during READ time, a one-shot multivibrator 188 is triggered to produce a positive pulse, labeled TC1, that serves to sample analog data into one of two shift registers, to be described, and to advance a tracking counter. At the trailing edge of each such pulse TC1, a one-shot multivibrator 189 is triggered to produce a companion pulse TC2, serving to move the sample during TC1 time through a currently connected analog shift register, for purposes to appear. The total duration of the pulses TC1 and TC2 should be such that a pulse TC1 does not occur until after the preceding pulse TC2 has passed.

Figure 13:
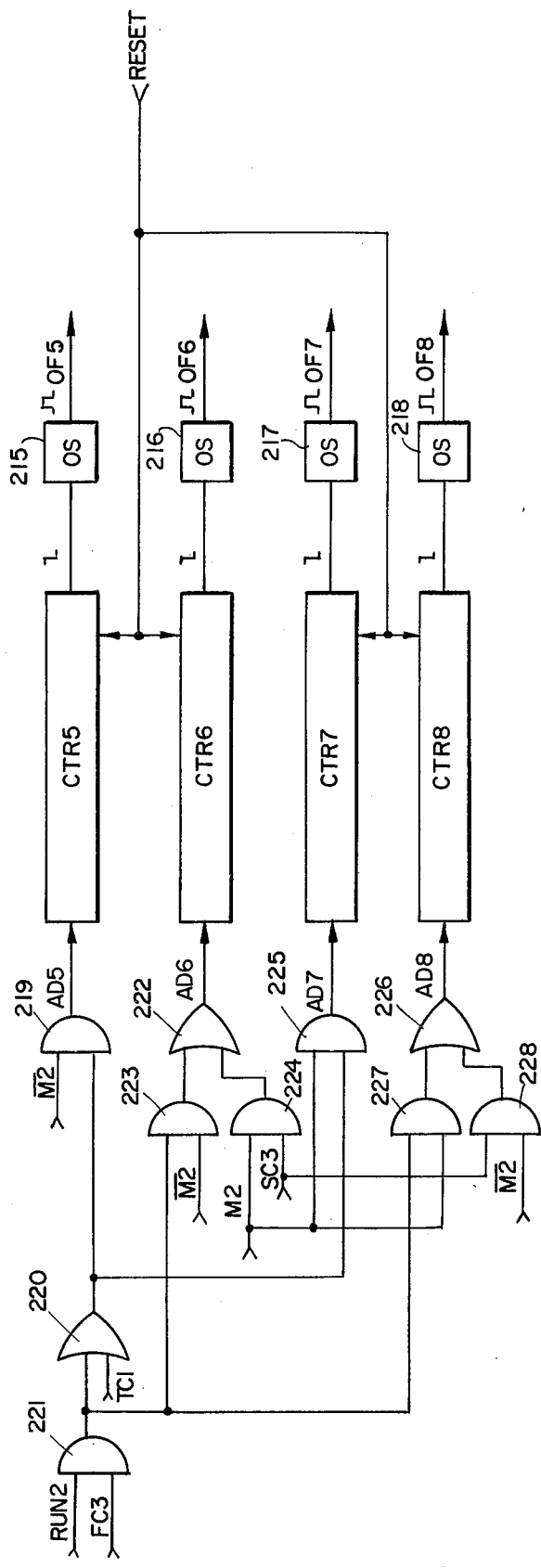
FIG. 13 is a schematic block and wiring diagram of timing circuits forming a portion of the system of FIG. 8.

Referring briefly to FIG. 13, another function of the RESET pulse is to reset four tracking counters CRT5, CTR6, CTR7, and CTR8, which are conventional ten stage binary counters whose function is to be described in more detail below, to their zero count, or reset, states.

Figure 12:
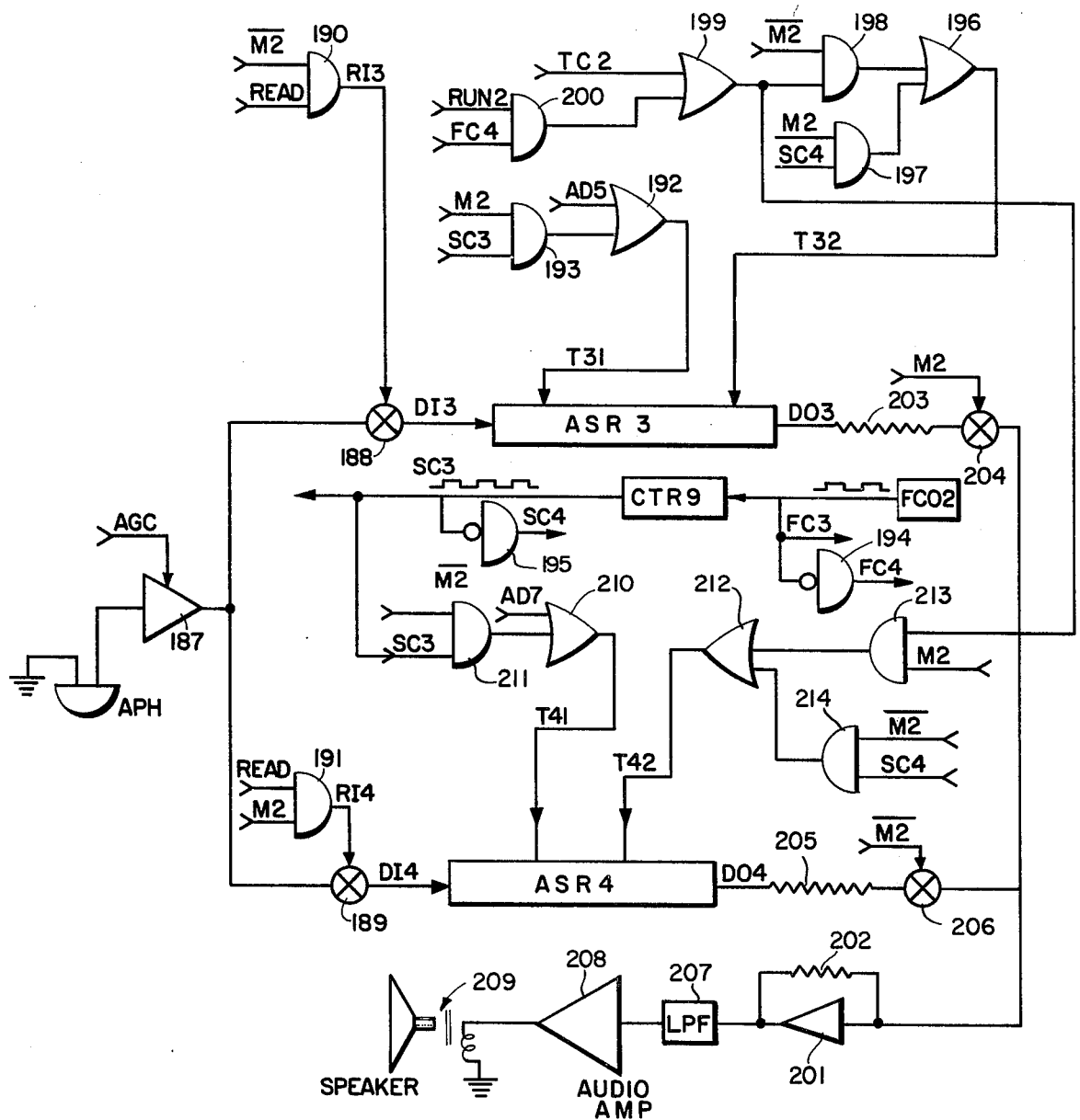
FIG. 12 is a schematic block and wiring diagram of recording and reproducing circuits forming a part of the system of FIG. 8.

Referring now to FIG. 12, the circuits for reproducing sound signals recorded on the film 8 will next be described. The playback head APH, a conventional transducer of any conventional variety, is arranged receive signals recorded by the recording head ARH at a location, referring now to FIG. 8, at the leading edge of the frame next to be moved into the projection station by the film drive pawl 131. In other words, if frame F0 in FIG. 4 is in the projection station in FIG. 8, the recording heads PH are located at the leading edge of the frame F1 which is next to be moved into the projection station. Either by making the heads APH and BPH in integral form, or so mounting them for relative adjustment that the phase between their gaps can be precisely adjusted, is necessary to make sure that the phase of the clock signals reproduced by the head BPH is appropriately timed relative to the phase of the audio signals sampled by the head APH.

The head APH is connected to the input terminals of a conventional audio preamplifier 187, which has a conventional automatic gain control circuit of any known design arranged to respond to the signal AGC produced in the manner described above to vary the gain of the amplifier 187 in accordance with the current speed of the film 8 past the head APH. It will be apparent to those skilled in the art that the magnitude of the signal received by the amplifier 187 will be proportional to the rate of change of flux with respect to time, which is determined both by the rate of change of the audio signal originally recorded by the microphone 6 and by the speed of the film 8 past the playback head. As the signal AGC is continuously varied in response to the density of the variable density filter 115 described above in connection with FIG. 15, it will be apparent that the output level of the amplifier 187 can be modulated in amplitude in such a fashion that the amplitude of the signal originally recorded by the microphone 6 can be reproduced. In this regard, the velocity profile of the camera's pulldown mechanism should be similar to that of the projector. If this similarity is preserved, it is not material that the pulldown interval in the projector is considerably shorter than that in the camera.

During intervals in which the playback head APH is not active, as when the film is stationary or during those periods at the beginning and end of pulldown during which the speed of the film 8 is not sufficient for recording or reproduction, the gain of the amplifier 187 can be brought down to a very low level by the presence of the opaque disc 111 in FIG. 15 between the lamp K6 and the photocell PC.

Referring again to FIG. 12, during times when it is appropriate to read from the film 8, the amplifier 187 is connected to one or the other of two analog shift registers ASR3 and ASR4 over the closed one of two analog electronic switches 188 and 189. The shift registers ASR3 and ASR4 may be identical to the shift registers ASR1 and ASR2 described above, and in particular may be of the construction to be described below in connection with FIG. 14.

the switch 188 is normally open, and is arranged to be closed by a logic 1 signal appearing at the output of an AND gate 109 when the signals $\overline{M2}$ and READ are produced in the manner described above. When closed, the switch 188 present signals DI3 to the input terminal of the shift register ASR 3 which correspond to the signal appearing at the output of the amplifier 187.

The switch 189 is normally open, and is adapted to be closed when a logic 1 signal RI4 appears at the output terminal of an AND gate 191 in response to the presence of the signals READ and M2. When the switch 189 is closed, a signal DI4 corresponding to the output of the amplifier 187 is presented to the input terminal of the shift register ASR4.

Samples of the signal DI3 are entered into the left end of the register ASR3, and previously entered samples are advanced to the next stage of the register ASR3, when a sampling pulse T31 is produced This pulse T31 is produced when a logic 1 signal appears at the output terminal of a conventional OR gate 192. The OR gate 192 receives a signal AD5, produced in a manner to be described, and also receives logic 1 signals produced at the output terminal of a conventional AND gate 193. The gate 913 receives the signals M2 and SC3, and produces a logic 1 signal when both of these signals are present at logic 1.

When the projector is turned on by the closure of the switch 142 in FIG. 8, a fast clock oscillator FCO2 produces a repetitive train of pulses in the form of a symmetrical square wave at a repetition rate of, for example, 148.8 KHz. These pulses, labeled FC3, are applied to an OR gate 194 to produce a complementary train of pulses FC4 at logic 1 when the pulses FC3 are at logic 0.

The pulses FC3 are also applied to step a conventional binary counter CTR9, which may be a three stage counter. The output terminal of the counter 9 will accordingly produce a square wave at one-eighth the repetition rate of the pulses FC3. This square wave, the positive pulses of which are labeled SC3, is at 18.6 KHz. It will be recalled that this is the same frequency as the slow clock oscillator used to time samples into the analog shift registers of the recorder during photography and recording. The pulses SC3 are applied to a NOR gate 195 to produce a complementary train of pulses SC4.

Following each pulse T31 applied to enter a sample into the register ASR3, a pulse T32 is produced by a logic 1 signal appearing at the output terminal of a conventional OR gate 196. These pulses are produced either in response to logic 1 signals appearing at the output of an AND gate 197, or at the output terminal of a second AND gate 198. The gate 197 produces a pulse following each pulse produced by the gate 193, in response to the signals M2 and SC4. The gate 198 receives the signal $\overline{M2}$, and the output signal from an OR gate 199. The gate 199 receives pulses TC2 from the one-shot multivibrator 189 in FIG. 11, and also receives output signals from an AND gate 200. The gate 200 receives the signals RUN 2 and FC4.

Depending on the state of the flip flop 171 in FIG. 11, one or the other of the output terminals of the analog shift registers ASR3 and ASR4 is connected to the input terminal of an operational amplifier 201. This amplifier is shown as provided with a conventional degenerative feedback resistor 202. The active input terminal of the amplifier 201 is at times connected to receive output analog signals D03 appearing at the right end of the shift register ASR3 and applied through a summing resistor 203 and an electronic switch 204 that is closed in response to the presence of the signal M2. When the signal M2 is not present, analog signals D04 appearing at the output terminal of the shift register ASR4 are applied to the input terminal of the amplifier 201 through a summing resistor 205 and an electronic switch 206 which is closed when the signal $\overline{M2}$ is present.

Output signals produced by the amplifier 201 are applied through a low pass filter 207 to a conventional audio amplifier 208. The output terminals of the amplifier 208 are connected to a conventional speaker schematically shown at 209.

When the shift register ASR4 is performing the functions of the shift registers ASR3, corresponding sample pulses T41 and transfer pulses T42 are produced. The pulses T41 are produced at the output terminal of an OR gate 210 in response to either pulses AD7, produced in a manner to be described, or to logic 1 signals appearing at the output terminal of an AND gate 211. The gate 211 receives the slow clock pulses SC3 and the signal $\overline{M2}$.

The pulses T42 are produced following each pulse T41 by a logic 1 signal appearing at the output terminal of an OR gate 212. Logic 1 pulses are supplied to the input terminal of this gate either by an AND gate 213 or an AND gate 214. The gate 213 receives the signal M2 and the output signal from the OR gate 199. The gate 214 receives the signals $\overline{M2}$ and SC4.

FIG. 13 shows four tracking counters CTR5, CTR6, CTR7 and CTR8 which are used to keep track of the operations performed on the shift registers ASR3 and ASR4 of FIG. 12 during playback. Each of these counters may be a ten stage binary counter capable of registering 1024 states. These counters are reset to their zero or reset states by the RESET pulse, as schematically indicated. Each counter, when it overflows and thus returns to its RESET state in response to advance counts supplied to it, produces a falling transition at its output terminal which triggers a one-shot multivibrator to produce an overflow pulse. In particular, overflow of the counter CTR5 triggers a one-shot multivibrator 215 to produce a short positive pulse labeled OF5. The counter CTR6 when advanced to overflow triggers a one-shot multivibrator 216 to produce a pulse labeled OF6. The counter CTR7 similarly triggers a one-shot multivibrator 217 to produce a pulse labeled OF7, and the counter CTR8 triggers a one-shot multivibrator 218 to produce a pulse labeled OF8.

The counter CTR5 is stepped by advance pulses AD5 produced as logic 1 signals at the output of an AND gate 219. This gate is enabled by the level M2 applied to one of its input terminals, and has a second input terminal connected to the output terminal of an OR gate 220. The gate 220 receives the pulses TC1, and also receives the signals at the output terminal of an AND gate 221. The gate 221 receives the signals RUN 2 and FC3.

As will appear, the counter CTR5 is employed when the signal M2 is present to register the entry of samples into the analog shift register ASR3 when data is being read from the track into the shift register, and is advanced during the runout mode when the signal RUN 2 is present by fast clock pulses FC3 to track the shifting of data in the register ASR3 to the right hand end in FIG. 12. The overflow of this counter starts the runout mode by the production of the pulse OF5 that resets the flip flop 175 in FIG. 11 through the OR gate 174.

The counter CTR6 is advanced by logic 1 transitions labeled AD6 produced at the output terminal of an OR gate 222. The gate 222 receives output signals from an AND gate 223, and also receives the output signals from an AND gate 224. The gate 223 receives the output signals from the AND gate 221, and also the signal $\overline{M2}$. The gate 224 receives the pulses SC3 and is enabled when the signal M2 is present.

When the signal $\overline{M2}$ is present, the counter CTR6 is stepped through the gates 221, 223 and 222 to register the number of pulses it takes to bring the counter CTR5 to overflow. When the signal M2 is present, causing the contents of the shift register ASR3 in FIG. 12 to be delivered to the loudspeaker, advance of samples to the loudspeaker is tracked by the counter CTR6 through the gates 224 and 222. Overflow of the counter CTR6 produces a pulse OF6 that reset the mode flip flop 171 in FIG. 11 to its $\overline{M2}$ state.

The counter CTR7 performs functions complementary to those of the counter CTR5 and is advanced by pulses AD7 appearing as logic 1 signals at the output terminal of an AND gate 225. The gate 225 receives the signals M2 and the output signals at the output terminal of the gate 220. When the signal M2 is present, the pulses AD7 are accordingly produced to track the entry of data into the register ASR4 in response to TC1 pulses applied to the gate 220 and thence to the gate 225. During the time when the signal RUN 2 is present and the signal M2 is present, the counter CTR7 is advanced to overflow by signals FC3, involving the gates 220 and 225.

The counter CTR8 performs functions complementary to those of the counter CTR6. For this purpose, it is advanced by pulses AD8 produced at the output terminal of an OR gate 226. The 226 at times receives logic 1 signals from the output terminals of either of two AND gates 227 and 228. The gate 227 receives the output signals from the AND gate 221, and also the level M2. The gate 228 receives the levels $\overline{M2}$ and SC3. Thus, when the signal RUN 2 is present and the contents of the shift register ASR4 are being advanced to the right in FIG. 12, advance pulses AD8 are produced by the gates 221, 227 and 226 to register the difference between the number of samples actually entered and the contents of the register CTR7. When the shift register ASR4 is connected to the loudspeaker in the presence of the signal $\overline{M2}$, the gates 228 and 226 produce pulses AD8 that register the transfer of successive samples to the loudspeaker. The overflow of the counter CTR8 produces the pulse OF8 that resets the flip flop 171 in FIG. 11 to its M2 state through the gate 170.

Figure 14:
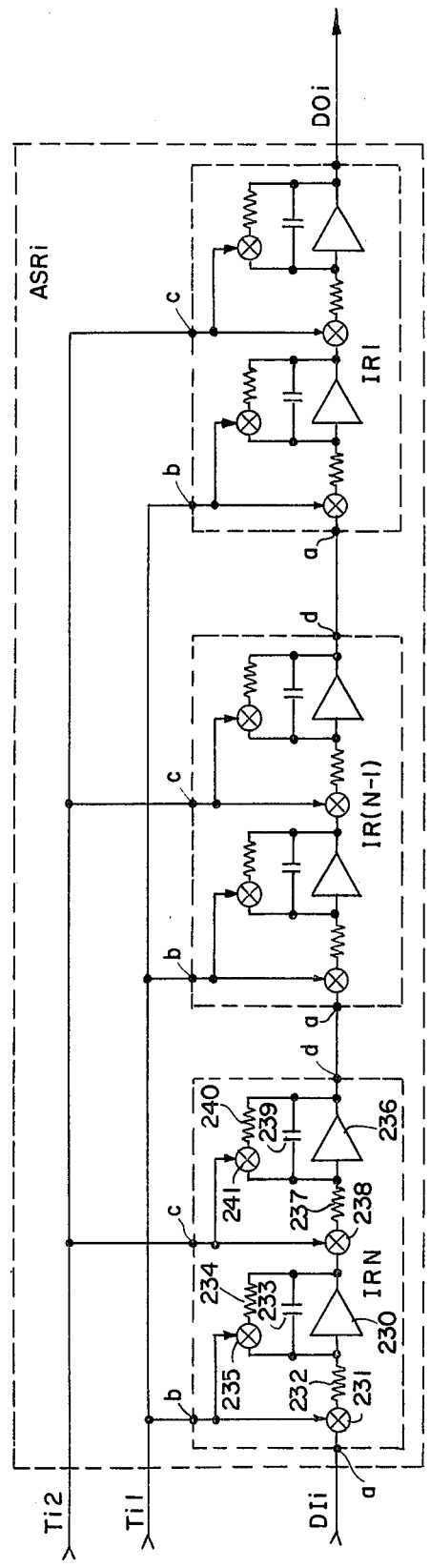
FIG. 14 is a schematic block and wiring diagram of an analog shift register suitable for use in the circuits of FIGS. 6 and 12.

FIG. 14 shows a circuit, described more fully in the above-cited U.S. Pat. No. 3,832,045, suitable for use as any of the shift registers ASR1, ASR2, ASR3 or ASR4 described above. Basically, the shift register ASRi, in which $i$ may stand for 1, 2, 3 or 4 in FIGS. 6 and 12, comprises 1024 stages IRI through IRN, IRI being identified as the stage that is to the right in each of the other figures and which produces the output signal labeled DOi, where $i$ can stand for 1, 2, 3 or 4. The stage IRN, that being the first stage to the left in FIG. 14, corresponds to the input stage which receives the input signals DIi at an input terminal $a$.

The register stages IR1 through IRN may be identical. Typical register stage IRN will next be described.

The stage IRN comprises two identical sample-and-hold circuits connected in series. The first such circuit comprises an amplifier 230 having an input circuit path from an input terminal $a$ through the load terminals of a conventional electronic switch 231 and a resistor 232.

A degnerative feedback network is provided between the active output and input terminals of the amplifier 230. This network comprises a capacitor 233 in parallel with the series combination of a resistor 234 and the load terminals of a conventional electronic switch 235.

The electronic switches 231 and 235 may be of any conventional type, such as transistors or the like. Each switch has a control terminal distinguished by an arrowhead. When a logic 1 signal, assumed to be positive with respect to ground, is applied to this control terminal, the switch is closed, and which a logic 0 signal, such as ground potential, is applied to the control terminal, the switch is open.

The control terminals of the switches 231 and 235 are connected together to an input terminal $b$. When a logic 1 signal Ti1, such as the signal T11 for the register ASR1, is applied to this input terminal $b$, both switches are closed and the amplifier rapidly produces an output signal that is proportional to the amplitude of an analog signal applied to the input terminal $a$. A voltage equal to the output signal is stored by the capacitor 233, and remains to keep the output signal essentially constant after the switches 231 and 235 are opened.

If the resistors 232 and 234 have resistances R1 and R2, respectively, the capacitor 233 has a capacitance C, and the amplifier 230 has an internal gain A and an input resistance Ri when the switches 231 and 235 are open, the time constants T1 for storage of a sample, and T2 for discharge of the capacitor 233 in the holding state, are given by:

$$T1 = R_2C$$
$$T2 = AR_1C.$$

The output voltage $e_o$ that will be produced by the amplifier 230 in response to a voltage Dli applied to the input terminal $a$, assuming Dli to be substantially constant over the sampling interval, is given by:

$$e_o = R_2/R_1 \, Dli.$$

It will be apparent from these considerations that the sampling time can be very short compared to the holding time with readily attainable values of the constants. And the output signal is independent of the capacitance of the capacitor 238. Thus, the circuit is amenable to construction by conventional integrated circuit techniques.

A second sample-and-hold circuit in the stage IRN comprises an amplifier 236 having an input terminal connected to the output terminal of the amplifier 230 through a resistor 237 and the load terminals of an electronic switch 238. A storage capacitor 239 is connected between the input and output terminals of the amplifier 236. A resistor 240 and the load terminals of an electronic switch 241 are connected in series across the capacitor 239.

The control terminals of the switches 238 and 241 are connected together and to an input terminal $c$ of the stage IRN. Thus, the switches are closed to sample the output signal from the amplifier 230 when a positive pulse Ti2, such as the pulse T22 for the register ASR1, is applied to the terminal $c$.

If the values of the resistors 237 and 240 are R3 and R4, respectively, the output signal $e_o$ produced at the output terminal $d$ of the stage IRN when the input signal Dli is applied to terminal $a$, the switches 231 and 235 have been closed by a pulse Ti1 and opened, and the switches 238 and 241 have subsequently been closed by a pulse Ti2 and opened, is given by:

$$e_o = \frac{R_2R_4}{R_1R_3} Dli.$$

The individual factors $R_2/R_1$ and $R_4/R_3$ are not particularly critical, although it is desirable to have $R_2R_4/R_1R_3$ near 1 to avoid progressive increases or decreases in level as the samples progress through the register stages.

It will be apparent that the sampling pulses Ti1 are applied to each stage IRi through IRN of the register ASRI, and the pulses Ti2 are also applied to each stage of the register. At times when the signal Dli is present as the analog output signal from an amplifier, as when the switch 75 in FIG. 6 is closed to supply analog signals Dli to the register ASR1, or the switch 76 is closed to supply corresponding signals DI2 to the register ASR2, each advance in the register shown in FIG. 14 that is caused by the pulse Ti1 followed by a pulse Ti2 causes a sample to be copied into the first stage such as the capacitors 233 in stage IRN, and then transferred to the second stage as the charge on the capacitor 239. It will be apparent that when the contents of the register are being advanced and an open circuit is present at the lead labeled Dli, as when the switch 189 in FIG. 12 is open in the absence of the signal RI4, it will be apparent that closing the switches 231 and 235 in FIG. 14 will effect a discharge of the capacitor 233 because there is an open circuit at the input terminal $a$. At the next pulse Ti2, this zero will be copied into the second stage of the register as no charge on the capacitor 239. Thus, as samples are advanced in the register until the first analog sample put in appears in the last stage IR1, as an output signal DOI, zeros are copied into the left hand side of the register. These zeros are propagated out during runout of the analog shift registers ASRi, so thay they never appear as an output signal.

Having described the apparatus of the projector of the invention, its operation will next be described, with reference to FIGS. 8 through 15.

Assume a film 8 has been exposed in the camera in the manner described above, and has sound recorded on it, and that it has been processed and is disposed primarily on the supply reel 9 in the apparatus of FIG. 8. For convenience, assume that frame F0 in FIG. 4 is in the projection station of the projector of FIG. 8.

Next, assume that the shutter is in the detented position shown in FIG. 9, and that the switch 142 in FIG. 8 is closed to energized to power supply 141. At the appearance of the signal B-, the one-shot multivibrator 167 in FIG. 11 will be triggered to produce the initial timing pulse SO. The supply voltage will now be applied to the control circuits for the motor 134 in FIG. 8, and the motor will begin to run, moving the shutter 128 in FIG. 9 until the aperture 146 exposes the photodiode PD5 to the lamp K5. That action will trigger the one-shot multivibrator 153 in FIG. 11 to produce the pulse S5P. The occurrence of this pulse S5P during the pulse SO will cause the AND gate 168 to trigger the one-shot multivibrator 169 and produce the RESET pulse. The RESET pulse will set the flip flop 171 through the gate 170 to produce the level M2. The flip flops 173, 175 and 184 will all be reset. Similarly, the counters CTR5, CTR6, CTR7 and CTR8 in FIG. 13 will be reset to their count zero states.

The next significant operation that will occur will be three successive projections of an image of frame FO on the screen 122 in FIG. 8 by the passage of the apertures 145, 144 and 143 past the lens 129. During this interval, since there has been nothing recorded on the frame FO, either a white blank frame or a dark frame, supposing a preexposure of the film to prevent the projection of a blank frame, will be produced as an image on the screen 122. During this interval, the signal ES will be absent so that the motor 134 will be looking for a minimum speed set by the position of the wiper 160 on the potentiometer 159. As the motor increases to this speed, the pulses produced by the one-shot multivibrator 155 in response to successive illuminations of the photodiode PD6 through the apertures in the disc 135 will progressively reduce the input signal of the amplifier 157 as this minimum speed is approached.

As the next significant event, the pawl 131 will begin to pull frame F1 down into the projection station. When the film reaches adequate speed for playback, the aperture 146 will pass over the photodiode PD3, causing the pulse S3P to be produced by the one-shot multivibrator 151 in FIG. 11.

This pulse S3P will set the flip flop 184 in FIG. 11 to its READ state. That will enable an AND gate 186 to respond to clock pulses appearing on the track 35 in FIG. 4 and detected by the playback head BPH in FIG. 11.

At each such pulse from the tape, the gate 186 will trigger the one-shot multivibrator 188 to produce a pulse TC1, and the trailing edge of this pulse will trigger the one-shot multivibrator 189 to produce a corresponding pulse TC2. The playback head APH in FIG. 12 is now reading data from the track 34 in FIG. 4, and the amplifier 187 is supplying signals to the analog shift register ASR4. The switch 189 is closed at this time by the signal RI4 produced by the gate 191 in response to the signals READ and M2.

Samples are taken into the register ASR4 during this interval by pulses T41 produced by gate 210 in response to pulses AD7. Referring to FIG. 13, these pulses AD7 are produced by the gate 225 in response to the signal M2 and TC1 pulses applied to the OR gate 220. As the data is entered into the register AS4 in this manner, it is tracked by the AD7 pulses advancing the counter CTR7.

As the shift register ASR4 is being loaded with data for frame F1 in the manner just described, the contents of the empty shift register ASR3 are applied to the amplifier 201 through the summing resistor 203 and the switch 204 closed by the signal M2. The switch 188 is open, so that nothing is entered into the register ASR3 at this time. Advance pulses T31 are produced by the gates 193 and 192 in the presence of the signal M2 at each SC3 pulse. Corresponding pulses T32 are produced by the gates 197 and 196 in response to the signals M2 and SC4.

However, since all the signals DI3 presented to the amplifier 201 at this time are zeros, no loudspeaker output will be produced. During the advance of the empty register ASR3, it is tracked by the counter CTR6 in response to AD6 pulses produced by the gates 224 and 222 in the presence at level M2 at each slow clock pulse SC3.

The next significant event will be the passage of the aperture 146 in FIG. 9 over the photodiode PD4. That will cause the pulse S4P to be produced by multivibrator 152 in FIG. 11. The pulse S4P will reset the flip flop 184, removing the READ level, and will set the flip flops 173 and 175 to produce the signals TIME and RUN 2. Referring to FIG. 12, in the absence of the signal READ, the switch 189 will be open, and no further input signals will be applied to the register ASR4.

The contents of the shift register ASR4 in FIG. 12 will now be advanced to the right, until they appear in the last stage, shown as the stage IR1 in FIG. 14. Assuming, for example, that 974 clock pulses were recorded adjacent frame F1. That would require fifty advance cycles of the register ASR4. T41 pulses are produced for this purpose at this time by the gate 210 in response to the pulses AD7.

Signals AD7 are produced at this time by the gate 225 in FIG. 13 in response to output signals produced by the OR gate 220 in response to the logic 1 signals produced by the gate 221 in the presence of the level RUN 2 and each pulse FC3. These pulses AD7 also advance the counter CTR7 in FIG. 13. At the same time, the counter CTR8 is advanced by fifty pulses AD8 produced by the gates 221, 227 and 226 in response to the signals M2, RUN 2 and FC3. This action will continue until the counter CTR7 overflows, after the entry of fifty additional counts, triggering the one-shot multivibrator 217 to produce the pulse OF7.

The pulse OF7 will reset the flip flop 175 in FIG. 11 to produce the signal $\overline{\text{RUN 2}}$. The pulse OF7 will also reset the integrate and hold circuit by briefly closing the pulse 181 just before the switch 177 is closed to begin the integration mode.

The presence of the signal $\overline{\text{RUN 2}}$ in the presence of the signal TIME will enable the gate 176 to close the switch 177, causing the integrate and hold circuit comprising amplifier 178 to begin to integrate. That action will continue until the aperture 146 in FIG. 9 exposes a photodiode PD5 to produce a pulse S5P by triggering the one-shot multivibrator 153 in FIG. 11.

When the pulse S5P is produced, the flip flop 173 will be reset by the gate 172 to remove the level TIME and stop the integrate mode of operation. The capacitor 180 will now store a signal ES representing the need for a higher speed of the motor 134 in FIG. 8. This signal will persist until it is changed during the next integration interval.

When the counter CTR6, which has been tracking the advance of the contents of the empty shift register ASR3, overflows, the pulse OF6 produced by the multivibrator 216 in FIG. 13 will reset the flip flop 171 in FIG. 11 to its $\overline{\text{M2}}$ state. In that state, the shift register ASR4 will have its output terminal connected to the input terminal of the amplifier 201 through the summing resistor 205 and the switch 206 closed by the signal $\overline{\text{M2}}$. That will cause the sound originally stored for frame F1 to be read out to the loudspeaker during the interval in which frame F1 is displayed. During this interval, the counter CTR8, which has already been advanced by fifty counts in the manner described above, will be advanced by SC3 pulses by the gates 228 and 226 in FIG. 13 in the presence of the signal $\overline{\text{M2}}$.

During the next pulldown cycle, as frame F2 is pulled into the projection station, audio data accompanying frame 2 will be copied into the shift register ASR3 during the READ cycle produced by the pulses S3P, and terminated by the next following S4P pulse. That pulse S4P will set the levels TIME and RUN 2 by the setting of flip flops 173 and 175 in FIG. 11 as described above.

Prior to the occurrence of pulse S4P, the entry of data into the register ASR3 is tracked by the counter CTR5 in response to pulses TC1 applied through the gates 220 and 219, the latter being enabled by the signal $\overline{M2}$. During the RUN 2 cycle following the pulse S4P, the counter CTR5 will be advanced to runout through the gates 221, 220 and 219, and the number of counts required to do that will be registered by the counter CTR6 advanced through the gates 221, 223 and 222.

The pulse OF5, produced when the counter CTR5 overflows closes the switch 181 in FIG. 11 briefly to reset the integrate and hold circuit, and resets the flip flop 175 to produce the level $\overline{\text{RUN 2}}$. The next action will be the closure of the switch 177 by the gate 176 to integrate to a new value of the signal ES depending on the number of samples in frame 2 and the speed of the motor 134 in FIG. 8. The register ASR3 is now loaded with data for frame 2 and awaits the runout of the counter CTR8 that is tracking the readout of information from the storage register ASR4 in FIG. 12 to be connected to the audio output circuit.

It is believed that the above description of the operation of the projector will enable those skilled in the art to understand the operation of the apparatus on sequential cycles without further description.

It is possible to simplify the apparatus of the camera control system shown in FIGS. 5, 7 and 11, and to make a corresponding simplification in the apparatus of the projector control system shown in FIGS. 11 and 13, in order to reduce the amount of apparatus required. In particular, the counter CTR4 in FIG. 7, the OR gate 110 that advances the counter, and the one-shot multivibrator 103 that produces the overflow pulse OF4 may be omitted. To effect this simplification, the counter CTR2 may be used to carry out the functions of both counters CTR2 and CTR4 described above. For this purpose, the signal ADA is removed from the gate 109 in FIG. 7 and is replaced by the signal AD produced by the gate 56 in FIG. 5. The signal RO1 is not applied to the gate 109. Instead, both of the gates 67 and 68 in FIG. 5 may be omitted, and the clock ROC produced by the gate 66 can be applied as the second input signal to the gate 109. The pulse OF2 produced by the multivibrator 101 will be applied to the gate 73 in FIG. 5, so that the terminal receiving the signal OF4 can be removed from the gate 73, as the pulse OF2 will be produced at the appropriate times if the other circuit changes mentioned are made.

Similarly, in the projector circuit shown in FIGS. 11 and 13, it will be apparent that the counter CTR7 is used only when the signal M2 is present and the counter CTR5 is used only when the signal $\overline{M2}$ is present. Accordingly, the counter CTR7, its addressing AND gate 225, and the one-shot multivibrator 217 can be omitted if desired. The gate 219 addressing the counter CTR5 may be removed, and in its place the output signal from the OR gate 220 can be applied as the signal AD5 that advances the counter CTR5. Referring to FIG. 11, further simplification results when this is done by removing the terminal receiving the lead OF7 from the gate 174, and replacing the gate 183 by a simple connection to the control terminal of the switch 181 that receives the signal OF5.

Figure 16:
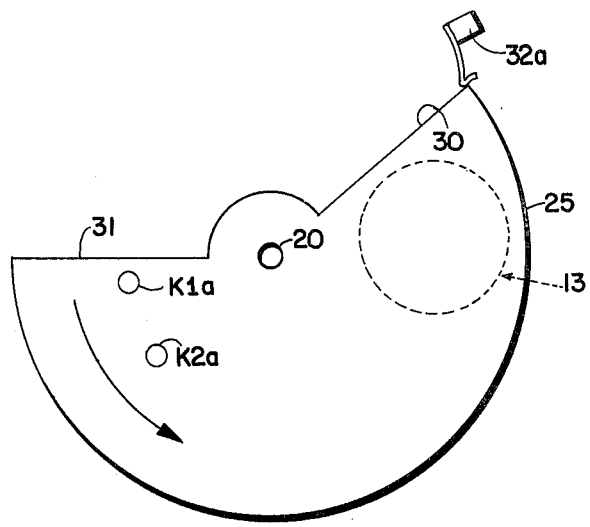
FIG. 16 is a schematic diagram of cycle timing apparatus in accordance with a modification of the invention.
Figure 17:
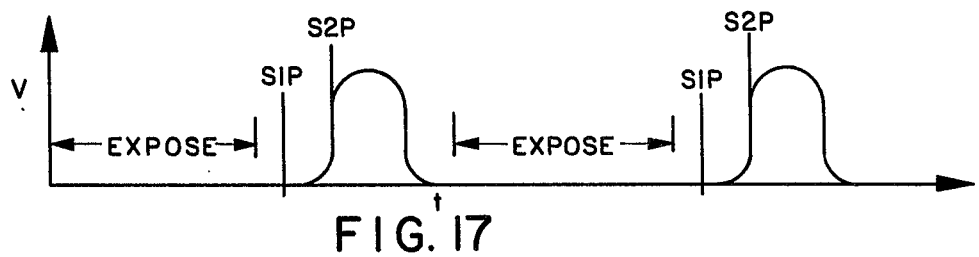
FIG. 17 is a graph of film speed vs. time illustrating the relationship of pulses produced by the apparatus of FIG. 16 in accordance with that modification.
Figure 18:
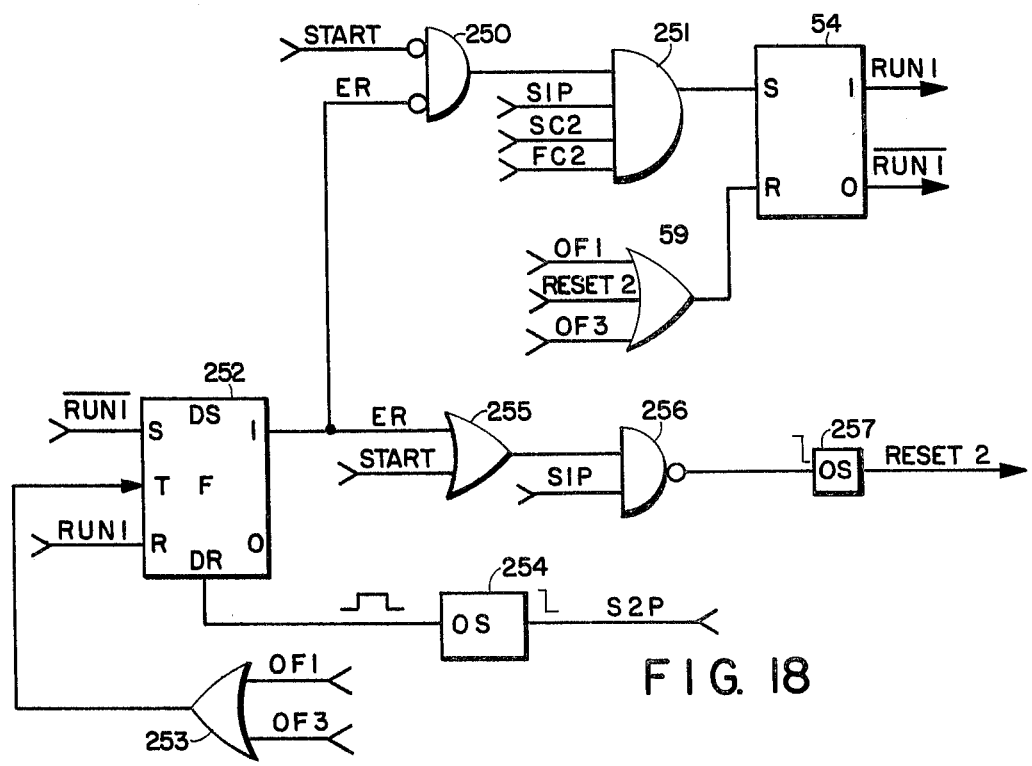

FIGS. 16, 17 and 18 illustrate modifications of the camera control system described in connection with FIGS. 1 through 7 which make the apparatus more suitable for use with bucket brigade analog shift registers such as the Amperex and Matsushita types described above. The reasons for the changes are that such shift registers lose signal appreciably if required to store signals without data advance for more than about 4 or 5 milliseconds.

In the system described above with respect to FIGS. 1 through 7, because it is necessary to run out an empty counter during the first cycle, a relatively long time is allowed during which the register not currently connected to the microphone is required to store information. That can be done with a circuit of the type described above in connection with FIG. 14, as the shift register stages such as IRN do not need either the presence of a signal Ti1 or the presence of a signal Ti2 to remain active. However, bucket brigade type shift registers would not be expected to have enough storage persistance time for this purpose.

If it is desired to use bucket brigade shift registers as the registers ASR1 and ASR2 in FIG. 6, the signals T12 and T22 may be provided by simply inverting the signals T11 and T21, as described above. In addition, as shown in FIG. 16, the detent 32a is moved to the new position shown relative to the lens 13, and the lamps K2a and K1a are moved to the position shown in FIG. 16. The photocells PD1 and PD2 illuminated by these lamps when the edge 31 passes over them are correspondingly moved.

The rearrangement of the detent and of the lamps and photodetectors just described will cause the apparatus to be stopped just before the pulldown cycle with the lamp K1a blocked by the shutter 25. As shown in FIG. 17, following an EXPOSE cycle, as the shutter continues to move from the position shown in FIG. 16, it will first unblock the lamp K1a, producing the pulse S1P in the manner shown in FIG. 5. Next, as the film speed rises to a sufficient value, the pulse S2P will be produced. If one allows approximately 2.2 milliseconds between the pulses, S1P and S2P, and data is in the current shift register waiting to be run out during the RUN 1 cycle, approximately 124 pulses can be used for this purpose during this interval. The time between the overflow of the counter tracking the shift register being run out, and the occurrence of the pulse S2P, when the shift register will be transferred to the READ mode to record information on the film in the manner described above, will thus be greatly reduced so that no long storage capability will be required.

There is one potential problem that may occur if this mode of operation is adopted. During the first pulldown cycle, before the motor comes up to speed, the counter currently reading data from the microphone may overflow before the pulse S2P is produced. That would cause a failure to reset the flip flop 54 in FIG. 5, so that the RUN 1 signal would continue, advancing the tracking registers in an indeterminate way.

FIG. 18 shows a modification of the circuit of FIG. 5 that will correct this problem. In particular, the flip flop 54 is not set by the gate 55 in FIG. 5, the gate 55 being replaced by an AND gate 251. This gate 251 receives the signals S1P, SC2 and FC2 formerly received by the gate 55, but in addition receives at times an inhibiting signal produced by a NOR gate 250 in response either to the START pulse, produced by the multivibrator 47 in FIG. 5, or a signal ER produced when a conventional synchronous flip flop 252 is set. This flip flop is of the type provided with direct set and direct reset terminals DS and DR, a set gate terminal S, a reset gate terminal R and a trigger terminal T. It is further provided with conventional logic 1 and logic 0 output terminals as shown.

The flip flop 252 produces an error signal labeled ER at any time when an overflow pulse OF1 or OF3 is produced by an OR gate 253, these pulses being produced by the counters CTR1 and CTR3 in FIG. 7 in the manner and for the purposes described above, if the flip flop 54 happens to be reset to produce the level RUN 2 before the pulse OF1 or OF3 that should reset it occurs. This action can occur if the counter overflow signal OF1 or OF3 occurs before the pulse S1P. The set gate terminal S requires a certain amount of time of application of the signal $\overline{\text{RUN 2}}$ before a trigger signal will change the state of the flip flop to the set condition, so that there is no race between the resetting of the flip flop 54 by the gate 59 and the setting of the flip flop 252 should the error condition be present.

The flip flop 252 is unconditionally reset following each pulse S2P. As shown, the trailing edge of each pulse S2P triggers a one-shot multivibrator 254 to apply a pulse to the direct reset input terminal DR of the flip flop 252.

The signal ER is only produced when one of the counters CTR1 and CTR3 overflows before the pulse S1P is produced. When produced, the signal ER acts through the gates 250 and 251 to inhibit the setting of a new RUN 1 cycle when the pulse S1P occurs.

As a counter which has overflowed prematurely may be in any state when the pulse S1P appears, it is desirable to use the presence of the condition ER to restart the system. For this purpose, the gates 48 and one-shot multivibrator 49 are omitted, and in their place are inserted an OR gate 255, which receives the signals ER and START, and has its output terminal connected to one input terminal of an AND gate 256. The gate 256 also receives the pulse S2P, and, when both inputs go to logic 1, produces a falling transition that triggers a one-shot multivibrator 257 to produce a pulse labeled RESET 2. This pulse RESET 2 is used in place of each of the RESET signals produced by the multivibrator 49 in FIG. 5, and starts everything over again with the counters in the 0 states.

No modification need be made in the projector apparatus described above, as there is no long waiting time required for shift register in this embodiment, so that bucket brigade type shift registers may be employed by simply inverting the pulses T31 and T41 in FIG. 12 from the pulses T32 and T42 as described above.

While the invention has been described with respect to the particular details of an illustrative embodiment, many changes and variations will occur to those skilled in the art upon reading this description. Such can obviously be made without departing from the scope of the invention.

Having thus described the invention, what is claimed is:

1. Means for reproducing a signal recorded at variable speed on a magnetic recording medium while moving the recording medium at variable speed, comprising a transducer, transport means for cyclically moving the recording medium at varying speeds past said transducer and then stopping the recording medium, an amplifier connected to said transducer and having a gain dependent on an applied automatic gain control signal, an optically coded disc, means for moving said disc at a speed synchronized with said transport means, and photoelectric means responsive to the optical coding of said disc to produce an automatic gain control signal to adjust the gain of said amplifier to remove amplitude variations in the recorded signal during reproduction.

2. Photographic apparatus for use with an elongated strip of photographic film having a series of image frame sections disposed therealong and an elongated magnetically recorded sound track section extending lengthwise therealong correlated to each of the image frame sections, said apparatus comprising:
   an image porjection station;
   means for intermittently imparting motion to progressive intermediate portions of the film strip adjacent said station to sequentially advance the image frame sections into a position at rest in operative relationship to said station;
   means for rendering said station operative to perform its intended photographic operation relative to the image frame sections as they are sequentially positioned at rest in operative relationship with respect to said station by said intermittent imparting motion means;
   audio information retrieving means for monitoring said elongated sound track and deriving periodic signals of electrical information therefrom during periods of said intermittent motion, said retrieving means including means for storing samples of said intermittently derived signals and for thereafter transcribing said stored samples into continuous audio information in correspondence to the photographic operations performed on respective frame sections subsequent to said periods of intermittent motion, said information retrieving means also including means for providing a first signal indicative of the complete transcription of at least a select portion of the samples stored by said sample storing means,
   means for monitoring the motion of said motion imparting means and for providing a second signal representative of a particular point in said intermittent motion, and
   speed control means responsive to said first and second signals for controlling the speed of said motion means so that said particular point in said intermittent motion substantially coincides with the complete transcription of all the samples stored in said select portion of said sample storing means.

3. The photographic apparatus of claim 2 wherein said audio information retrieving means includes a first analog shift register, a second analog shift register, means for alternately directing said periodic signals of electrical information into said first and second shift registers, means for alternately transcribing output signals from said first and second shift registers to provide said audio information means for causing said directing means to direct said periodic signals of electrical information into said first shift register while rendering operative said means for alternately transcribing output signals with respect to said second shift register and for causing said directing means to direct said periodic signals of electrical information into said second shift register while rendering operative said means for alternately transcribing output signals with respect to said first shift register, said first signal being periodically provided in correspondence with the complete transcription of output signals from each of said first and second shift registers respectively.

4. The photographic apparatus of claim 3 wherein said second signal is provided in substantial correspondence with the initiation of each of said intermittent photographic operations.

5. Means for reproducing a signal recorded at variable speed on a recording medium while moving the recording medium at variable speed, comprising a transducer, transport means for cyclically moving the recording medium past said transducer at varying speeds and then stopping the recording medium, an amplifier connected to said transducer and having a gain dependent on an applied gain control signal, means synchronized with said transport means for producing a gain control signal to adjust the gain of said amplifier to remove amplitude variations in the reproduced signal produced by the variations in speed of said medium relative to said transducer, and means for applying said gain control signal to said amplifier.

6. Photographic apparatus for use with an elongated strip of photographic film having a series of image frame sections disposed therealong and an elongated magnetically recorded sound track section extending lengthwise therealong correlated to each of the image frame sections, said apparatus comprising:

an image recording or image projection station;

means for intermittently imparting motion to progressive intermediate portions of the film strip adjacent said station to sequentially advance the image frame sections into a position at rest in operative relationship to said station;

means for rendering said station operative to perform its intended photographic operation relative to the image frame sections as they are sequentially positioned at rest in operative relationship with respect to said station by said intermittent imparting motion means;

audio information retrieving means for monitoring said elongated sound track and deriving periodic signals of electrical information therefrom during periods of said intermittent motion, said retrieving means including means for storing samples of said intermittently derived signals and for thereafter amplifying and transcribing said stored samples into continuous audio information in correspondence to the photographic operations performed on respective frame sections subsequent to said periods of intermittent motion, the gain of said amplification being dependent upon an applied gain control signal;

and means for deriving said gain control signal to apply to said audio information retrieving means as a function of the speed of said motion imparting means in order to reduce amplitude variations in the transcribed audio information resulting from variations in the speed of said sound track during said periods of intermittent motion.

* * * * *